(12) United States Patent
Rudoy

(10) Patent No.: US 10,698,094 B2
(45) Date of Patent: Jun. 30, 2020

(54) 3D-POSITION DETERMINATION METHOD AND DEVICE

(71) Applicant: Toposens GmbH, Munich (DE)

(72) Inventor: Alexander Rudoy, Munich (DE)

(73) Assignee: TOPOSENS GMBH, Munich (DE)

( * ) Notice: Subject to any disclaimer, the term of this patent is extended or adjusted under 35 U.S.C. 154(b) by 300 days.

(21) Appl. No.: 15/558,931

(22) PCT Filed: Jan. 29, 2016

(86) PCT No.: PCT/EP2016/051905
§ 371 (c)(1),
(2) Date: Sep. 15, 2017

(87) PCT Pub. No.: WO2016/146292
PCT Pub. Date: Sep. 22, 2016

(65) Prior Publication Data
US 2018/0074177 A1    Mar. 15, 2018

(30) Foreign Application Priority Data

Mar. 19, 2015 (DE) .......... 10 2015 003 584

(51) Int. Cl.
*G01S 13/00* (2006.01)
*G01S 17/00* (2020.01)
(Continued)

(52) U.S. Cl.
CPC .............. *G01S 13/003* (2013.01); *G01S 7/41* (2013.01); *G01S 7/4802* (2013.01); *G01S 7/539* (2013.01);
(Continued)

(58) Field of Classification Search
CPC combination set(s) only.
See application file for complete search history.

(56) References Cited

U.S. PATENT DOCUMENTS 2,515,332 A    7/1950    Budenbom
2003/0222778 A1*  12/2003  Piesinger ............... G01S 7/415
                                                    340/541
(Continued)

FOREIGN PATENT DOCUMENTS

DE          4120397         12/1992
DE         10260434          7/2004
(Continued)

OTHER PUBLICATIONS

International Search Report and Written Opinion for PCT Application No. PCT/EP2018/051905 dated May 4, 2016.
Mirbach et al, "A Simple Surface Estimation Algorithm for UWB Pulse Radars Based on Trilateration," IEEE International Conference on Ultra-Wideband, Sep. 14-16, 2011, pp. 273-277.

* cited by examiner

*Primary Examiner* — Mamadou L Diallo
(74) *Attorney, Agent, or Firm* — Lowe Graham Jones PLLC; Bruce E. Black

(57) ABSTRACT

A device and method for determining the three-dimensional position of an object. The device comprises at least one transmitter that is adapted to emit a signal; at least three receivers, wherein the at least three receivers and the at least one transmitter are preferably arranged within a first plane, wherein a first receiver and a second receiver are preferably arranged along a first straight line, and a third receiver is preferably arranged at a distance from the first straight line; and a processor that is configured to determine at least three propagation times, wherein the respective propagation time is a time required by the signal from the transmitter via the object to the respective receiver, and wherein the processor is further configured to determine the three-dimensional position of the object on the basis of the determined propagation times as well as on the basis of the arrangement of the transmitter and the receivers.

20 Claims, 20 Drawing Sheets

Figure 1:
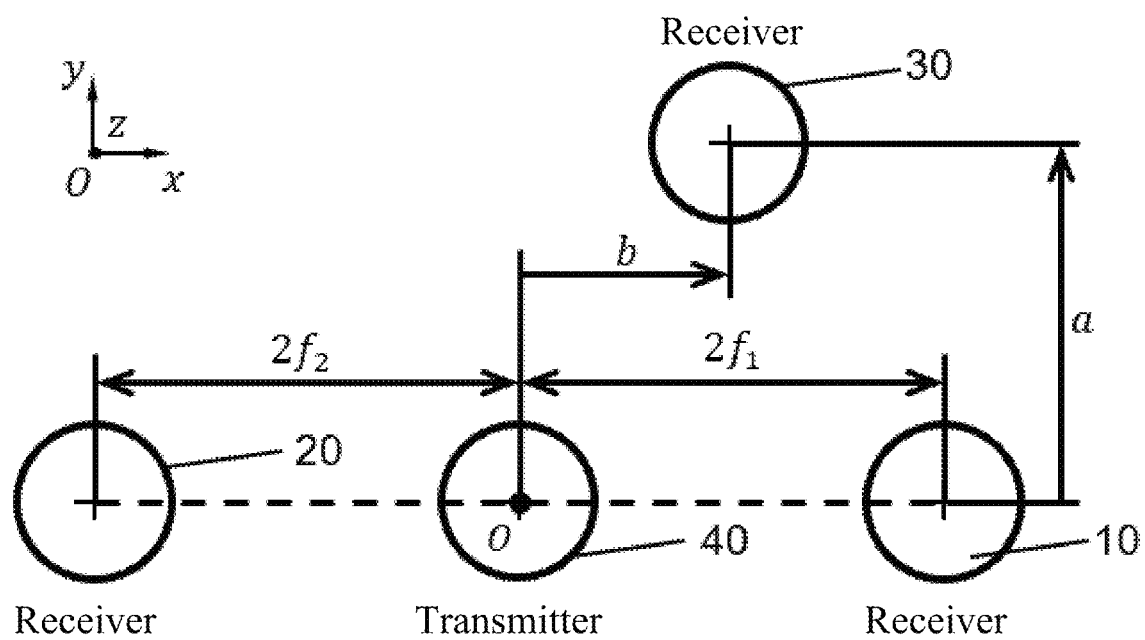

(51) Int. Cl.
*G01S 7/41* (2006.01)
*G01S 7/48* (2006.01)
*G01S 13/87* (2006.01)
*G01S 15/00* (2020.01)
*G01S 15/87* (2006.01)
*G01S 15/46* (2006.01)
*G01S 15/89* (2006.01)
*G01S 17/89* (2020.01)
*G01S 17/46* (2006.01)
*G01S 17/87* (2020.01)
*G01S 13/46* (2006.01)
*G01S 7/539* (2006.01)
*G01S 15/50* (2006.01)
*G01S 17/50* (2006.01)
*G01S 15/96* (2006.01)
*G01S 13/89* (2006.01)

(52) U.S. Cl.
CPC .......... *G01S 13/46* (2013.01); *G01S 13/878* (2013.01); *G01S 15/003* (2013.01); *G01S 15/46* (2013.01); *G01S 15/876* (2013.01); *G01S 15/89* (2013.01); *G01S 17/003* (2013.01); *G01S 17/46* (2013.01); *G01S 17/87* (2013.01); *G01S 17/89* (2013.01); *G01S 13/89* (2013.01); *G01S 15/50* (2013.01); *G01S 15/96* (2013.01); *G01S 17/50* (2013.01); *G01S 2013/466* (2013.01); *G01S 2015/465* (2013.01)

(56) References Cited

U.S. PATENT DOCUMENTS

| | | |
|---|---|---|
| 2006/0238407 A1 | 10/2006 | Bourdelais et al. |
| 2007/0211022 A1 | 9/2007 | Boillot |
| 2012/0001875 A1 | 1/2012 | Li et al. |
| 2012/0299820 A1* | 11/2012 | Dahl ................. G06F 3/011 345/156 |
| 2013/0172739 A1 | 7/2013 | Paladini |
| 2014/0111379 A1* | 4/2014 | Schelten ................ G01S 5/06 342/385 |
| 2014/0171789 A1* | 6/2014 | Barth ................. A61B 5/062 600/424 |
| 2014/0333472 A1* | 11/2014 | Nagy ................. G01S 13/48 342/133 |
| 2014/0340993 A1* | 11/2014 | Honda ................. G01S 15/42 367/99 |
| 2016/0223637 A1* | 8/2016 | Gentner ................ G01S 5/0273 |
| 2018/0139563 A1* | 5/2018 | Mertins ................ G01H 7/00 |

FOREIGN PATENT DOCUMENTS

| | | |
|---|---|---|
| DE | 10 2005 024 716 | 12/2006 |
| JP | H02-232580 | 9/1990 |
| JP | 2003-140819 | 5/2003 |
| JP | 2008-039497 | 2/2008 |
| JP | 2015-021737 | 2/2015 |
| WO | 2006/130004 | 12/2006 |
| WO | 2013/088951 | 6/2013 |

3D-POSITION DETERMINATION METHOD AND DEVICE

CROSS-REFERENCE TO RELATED APPLICATIONS

This present application is a U.S. national stage application of PCT Application No. PCT/EP2016/051905, filed Jan. 29, 2016, which claims priority to German Patent Application No. 10 2015 003 584.3 filed Mar. 19, 2015, both of which are hereby incorporated by reference in their entirety.

The present invention relates to a method and device for the three-dimensional position determination of a reflective or scattering object using at least three receivers and at least one transmitter.

Techniques which can determine the distance of an object to a signal source on the basis of a reflected signal relative to the signal source, such as, e.g., the distance measurement in the case of a vehicle, are known from the prior art. Thus, these systems only measure the distance to an object located in front of the system. Accordingly, it is not possible to determine a position of an object in the three-dimensional space with these known methods.

There are different solutions for the position determination (positioning) of objects in the three-dimensional space, such as, e.g., GPS positioning or GMS positioning. However, all these methods and their various variants require an object that actively emits a signal. Thus, the position of a passive object which does not actively emit a signal cannot be determined with the existing solutions.

WO 2006/130004 A1 describes a radar system for an aircraft for detecting, in use, at least one further airborne object within a region surrounding the aircraft, wherein the system comprises at least one subsystem comprising at least one transmitter for transmitting an electromagnetic probe signal and a phased array of receivers for simultaneously receiving reflections of the transmitted probe signal and for generating receiving signals which each represent a received reflection of the probe signal. The subsystem further comprises a signal processing unit for processing each of the receiving signals for obtaining information about a detected airborne object within the region surrounding the aircraft. The signal processing unit is arranged to determine the direction, relative to the aircraft, from which the received reflections originate, and wherein, for determining said direction, the signal processing unit is arranged to perform a. Fast Fourier Transform on a receiving signal.

US 2013/0172739 A1 describes a nuclear probe and an ultrasound transducer which are interconnected. The interconnection aligns the coordinate systems in a known spatial relationship. The ultrasound data are used to detect an offset of the transducer or a change in position of the transducer without using a tracking sensor.

The present invention is based on the object of providing a method and a device that permit a position determination of an object in the three-dimensional space, wherein the object can be in any place in space and does not have to actively emit a signal. A further object of the invention consists in the provision of a method and a device which eliminate one or more of the aforementioned disadvantages of the known systems. Further advantages of the present invention can be derived, i.a., from the following description.

This object is solved with the features of the independent claims. The dependent claims relate to further aspects of the invention.

According to an aspect of the present invention, a device for determining the three-dimensional position of an object is provided. The device according to the present invention comprises at least one transmitter that is adapted to emit a signal and at least three receivers, wherein the at least three receivers and the at least one transmitter are preferably arranged essentially within a first plane, wherein a first receiver and a second receiver are preferably arranged essentially along a first straight line, preferably at a distance from each other, and a third receiver is preferably arranged at a distance from the first straight line. Furthermore, the device according to the present invention comprises a processor that is configured to determine at least three propagation times, wherein the processor is further configured to determine the three-dimensional position of the object on the basis of the determined propagation times as well as on the basis of the arrangement of the transmitter and the receivers. The device according to the present invention is further adapted to determine the surface condition of an object in that the three-dimensional position of many points forming an object (point cloud) is determined. In this way, it is possible to determine not only the macroscopic shape of a three-dimensional object but also its microscopic surface condition (roughness).

If the at least one transmitter and the at least three receivers are not arranged within one plane, a position error occurs in the algorithm. The output positions, however, still exhibit the correct tendency. The offset of the sensors from the plane is manifested in a shorter or longer propagation time and thus in an imaginarily offset position of the object.

As described above by the term "at a distance", the two receivers should have a distance between them in order to generate a plane through the two receivers and the object. The distance may be infinitesimally small. This applies equivalently to the distance between the first straight line and the third receiver.

What is meant in this connection by the determination of the three-dimensional position of the object in space is the determination of all coordinates (e.g., x-, y- and z-coordinates in a Cartesian coordinate system) of the object, for example of its center of gravity relative to the arrangement of the transmitter and the receivers. In some embodiments, this determination may also be the determination of the position in a half space (e.g., $z>0$).

Preferably, the propagation time is determined in this connection as the time difference between the time at which a signal reflected and/or scattered by the object is detected at a receiver and the time at which the transmitter emitted the signal corresponding to the received signal.

The, for example preset, arrangement of the transmitter and the receivers can be stored in the processor (or an associated memory) or determined by measurement techniques for the purpose of determining the position, as described in more detail in the following.

The transmitter is preferably arranged on the first straight line between the first and second receivers, for example centrically. Alternatively, the position of the transmitter can be essentially identical to the position of one of the at least three receivers. This can be realized, for example, in that one of the three receivers at the same time serves also as a transmitter. In other words, the transmitter can be an independent unit that is solely adapted to emit a signal. However, the transmitter can also be integrated into a receiver. Thus, the position of the transmitter and the receiver can be essentially identical. A receiver having transmitting and receiving functionalities in one unit can also be referred to as a sensor. However, it may be sufficient to arrange a transmitting unit and a receiver unit next to each other. Furthermore, the transmitter can also be arranged at a predetermined distance perpendicularly to the first straight line. In other words, the starting point of the signal can be offset by a predetermined distance perpendicularly to the straight line and/or perpendicularly to the plane.

It is also possible that three transmitters are integrated in the three receivers, wherein all of the transmitters, for example, can emit (differently modulated signals) at the same time or in a time-shifted way.

The transmitter can be preferably adapted to emit the signal isotropically in all spatial directions or at least in a half space or be a semicircular transmitter. In the latter case, the center of the semicircular transmitter is preferably in the first plane and on the first straight line so that the signal has its starting point on a semicircle at a distance (radius of the semicircle) from the first straight line. In the context of the invention, however, this is to be understood such that the semicircular transmitter is arranged within the first plane.

The processor can be further configured to determine a first elliptical orbit or a first semielliptical orbit within a second plane on the basis of a first propagation time that the signal requires from the transmitter via the object to the first receiver and to determine a second elliptical orbit or a second semielliptical orbit within the second plane on the basis of a second propagation time that the signal requires from the transmitter via the object to the second receiver, wherein the position of the object in the three-dimensional space is calculated using the position of the intersection of the two elliptical orbits or semielliptical orbits in the second plane.

The x-coordinate, for example, can be defined as a coordinate along the first straight line. In this exemplary coordinate system, the y-coordinate can be a coordinate perpendicular to the x-coordinate, wherein the x-coordinate and the y-coordinate define the first plane. Thus, the z-coordinate is a coordinate that runs perpendicularly through the first plane. Preferably, the coordinate origin is placed on the position of the transmitter. It is clear, however, that the position of the coordinate system has no influence on the measuring principle and can be freely selected.

According to the present invention it is likewise possible that the first focal point of the first elliptical orbit coincides with the second focal point of the first elliptical orbit and the first focal point of the second elliptical orbit coincides with the second focal point of the second elliptical orbit. In this case, the ellipse is a circle (as a special case of an ellipse). In other words, it is also possible according to the present invention to determine a first circular orbit or semicircular orbit within a second plane on the basis of a first propagation time that the signal requires from the transmitter via the object to the first receiver and to determine a second circular orbit or semicircular orbit within the second plane on the basis of a second propagation time that the signal requires from the transmitter via the object to the second receiver, wherein the position of the object in the three-dimensional space is calculated using the position of the intersection of the two circular orbits or semicircular orbits in the second plane.

Preferably, the processor is further configured to determine an angle between the first and second planes on the basis of a third propagation time that the signal requires from the transmitter via the object to the third receiver. In other words, the position of the second plane (in comparison to the first plane) is determined via the third propagation time. Without the third propagation time, it is only possible to determine the position within the second plane. By means of the third propagation time, a line is generated that permits to determine the angle or tilt between the two planes.

Thus, the three-dimensional position, i.e., for example the x-, y-, z-coordinates of the position of the object in the case of a Cartesian coordinate system, can be determined in the three-dimensional space on the basis of the intersections of the two elliptical orbits or semielliptical orbits in the second plane and the position/angle/tilt of the second plane (in comparison to the first plane). Since, strictly speaking, there are two intersections of two intersecting ellipses, the correct one of the two intersections is selected on the basis of the knowledge of the arrangement of the system (for example, on the basis of the assumption that the transmitter only emits signals in a half space or that, for geometrical reasons, an object can only be present at one of the two intersections).

The x-coordinate, for example, can be defined as a coordinate along the first straight line. In this exemplary coordinate system, the y-coordinate can be a coordinate perpendicular to the x-coordinate, wherein the x-coordinate and the y-coordinate define the first plane. Thus, the z-coordinate is a coordinate that runs perpendicularly through the first plane. Preferably, the coordinate origin is placed on the position of the transmitter. It is clear, however, that the position of the coordinate system has no influence on the measuring principle and can be freely selected.

If a semicircular transmitter is used so that the signal has its starting point on a semicircle at a distance (radius h of the semicircle) from the first straight line, a tilt of the semielliptical orbits is generated. This tilt is generated by the distance (radius) h of the starting signal of the semicircular transmitter. The signal is emitted higher by the radius h (in the second plane) than in the case of a method without the semicircular transmitter. The two focal points of the two semielliptical orbits are thereby raised by the distance h and the upper (positive) semielliptical orbits are tilted upwards and the lower (negative) semielliptical orbits are tilted downwards.

As described in more detail further below, this may entail a tilt of the semielliptical orbits. Preferably at an angle of unequal to zero (or above a predetermined threshold value), the respective elliptical orbit can be divided into two semielliptical orbits along the first straight line and tilted by the angle relative to the first plane in a positive or in a negative direction. This method may be used, for example, if the signal source corresponds to a semicircular transmitter or also if the signal source has an extension that is large relative to the emitted radiation and thus approximately corresponds to an offset perpendicular to the first straight line.

According to a further aspect of the present invention, a device according to the preceding description is provided, wherein the device comprises a processor that is configured to determine the extension and/or the size and/or the condition of the surface of the object on the basis of the shape and/or the propagation time of one or more signals received by one or more of the at least three receivers, wherein preferably a signal source is used that emits a plurality of short pulses in order to enable the object to be represented as a point cloud in order to thus better detect the object geometry.

According to a further aspect of the present invention, a method for determining the three-dimensional position of an object is provided. The method comprises the steps of emitting a signal that is at least partly reflected and/or scattered by an object from a transmitting position and receiving the at least partly reflected and/or scattered signal at three or more receiving positions, wherein the at least three receiving positions are preferably arranged essentially within a first plane comprising the transmitting position, wherein a first receiving position and a second receiving position are preferably arranged essentially along a first straight line, preferably at a distance from each other, and a third receiving position is preferably arranged at a distance from the first straight line. The method further comprises the steps of determining at least three propagation times, wherein the respective propagation time is a time required by the signal from the transmitting position via the object to the respective receiving position, and obtaining the three-dimensional position of the object using the determined propagation times as well as the arrangement of the transmitting position and the receiving positions.

The transmitting position may be arranged along the first straight line, preferably between the first and second receiving positions, or it may be essentially identical to one of the at least three receiving positions.

The determination of a first coordinate of the three-dimensional position of the object can be performed on the basis of a first and a second propagation time that the signal requires from the transmitter via the object to the first and the second receiver, and the distances of the first and the second receiving position to the transmitting position, wherein the first coordinate defines the position of the object along the first straight line.

Preferably, the determination of the position of the object in the three-dimensional space is performed using an intersection of a first and a second elliptical orbit or a first and a second semielliptical orbit within a second plane, wherein a first propagation time that the signal requires from the transmitter via the object to the first receiver defines the first elliptical orbit or the first semielliptical orbit in the second plane and a second propagation time that the signal requires from the transmitter via the object to the second receiver defines the second elliptical orbit or the second semielliptical orbit in the second plane. Using the intersection of the first and the second elliptical orbit or the first and the second semielliptical orbit within the second plane permits not only a y-coordinate and a z-coordinate (exemplary coordinate system as described above) of the object to be determined in the three-dimensional space but also the x-coordinate (coordinate along the first straight line) of the object in the three-dimensional space. The second plane is defined in this connection by the first straight line and the object. In other words, the second plane is a plane that is defined by the first receiver, the second receiver and the object.

As described above, the first focal point of the first elliptical orbit can coincide with the second focal point of the first elliptical orbit and the first focal point of the second elliptical orbit can coincide with the second focal point of the second elliptical orbit so as to define a circular orbit.

Preferably, the calculation of the position of the object in the three-dimensional space is performed using an angle between the first and second planes, wherein the third propagation time that the signal requires from the transmitter via the object to the third receiver defines the angle. The angle defines in this connection a possible tilt of the first plane relative to the second plane (see also the above explanations).

Furthermore, the method can also comprise a step of calculating the distances of the receiving positions to the transmitting position, wherein the calculation of the distances is based on a propagation time of a signal transmitted directly from the transmitting position to the respective receiving position using a predetermined propagation speed.

In other words, if the propagation speed of the signal is known, the distances can be determined by means of the method according to the present invention on the basis of the propagation times of the signals measured directly from the transmitter to the respective receiver. Thus, the determination of the distances between the receivers and/or between the receivers and the transmitter before use can be omitted. This could enable, for example, a flexible attachment of the receivers and the transmitter, i.e. a fixed attachment of the elements at predetermined distances would not be necessarily required. This could also lead to lower manufacturing costs and more flexible fields of application, for example, the receivers and the transmitted could be stored separately from each other and attached to a present plane (e.g., a house wall, a bumper of a car, etc.) depending on the situation without having to exactly determine the distances. After use, the receivers and the transmitter could be detached from the plane and reattached to another plane. As a further example, the position of the individual receivers relative to the sensor could be determined in the production process of the sensor system and the algorithm could be adapted to the tolerance deviation of each individual sensor.

Alternatively, the method can comprise a step of calculating a propagation speed of the emitted signal, wherein the calculation of the propagation speed is based on the signal transmitted directly from the transmitting position to one of the at least three receiving positions using a predetermined distance between the transmitting position and the one of the at least three receiving positions.

In other words, if the distances between the receivers and the transmitter are known, the propagation speed of the signal transmitted directly from the transmitting position to one of the at least three receiving positions can be determined by means of the present invention. This is advantageous in order to provide a calibration of the device before the position determination. Furthermore, the propagation speed may situationally vary (e.g., due to a change in temperature of the surroundings, the use in different propagation media). Thus, a calibration before each measuring operation could improve, i.a., the measuring accuracy.

According to a further aspect of the present invention, a method as described above can be provided and additionally comprise a step of calculating the extension and/or the size and/or the condition of the surface of the object using the shape and/or the propagation time of one or more signals received by one or more of the three receiving positions.

It can be likewise advantageous that the method according to the present invention is carried out repeatedly and the transmitting position is varied and preferably alters between two or more receiving positions. Whereby, for example, the measuring accuracy can be increased.

The present invention is further directed to the use of the above-described device and method for one or a combination of the following applications: gesture recognition (gesture control), person recognition, position recognition of objects (people, items, etc.), speed measurement of objects (people, items, etc.), area monitoring (alarm system, presence sensing), volume recognition, recognition of geometries (3D scanner), generation of a 3D color picture (sensor+camera), nondestructive material testing, body scan (e.g., organ, tissue and bone scans), fish finder, scanning bottoms of waters, microscopy, mapping, representation of temperature flow and gas flow, environment recognition (e.g., for autonomous vehicles, unmanned aerial vehicles), ground scanner for the search for raw materials and/or recognition of the ground infrastructure, navigation, scanning objects (recognition of the inner structure), security applications (e.g., at the airport), recognition of moving objects, meteorological observations, use for controlling machines, use in the military field (e.g., mine sweeper), level measurement, height control, attendance check, collision protection, path detection, distance measurement and/or classification.

The present invention is basically applicable to any kind of waves as far as corresponding transmitters and receivers can be designed for such waves, and it comprises in particular electromagnetic waves, such as, e.g., radio waves, microwaves, thermal radiation, light, x-rays, gamma radiation; pressure waves, e.g., acoustic waves, shock waves; gravitational waves; radiation, such as, e.g., particle radiation and undulatory radiation; plasma waves; matter waves; bending waves; seismic waves; magnetic waves; electric waves.

Features described in connection with the method according to the invention can, of course, correspond to respective properties of the respective means of the device according to the present invention. Analogously, features of the described device of the present invention can correspond to method features.

Figure 2:
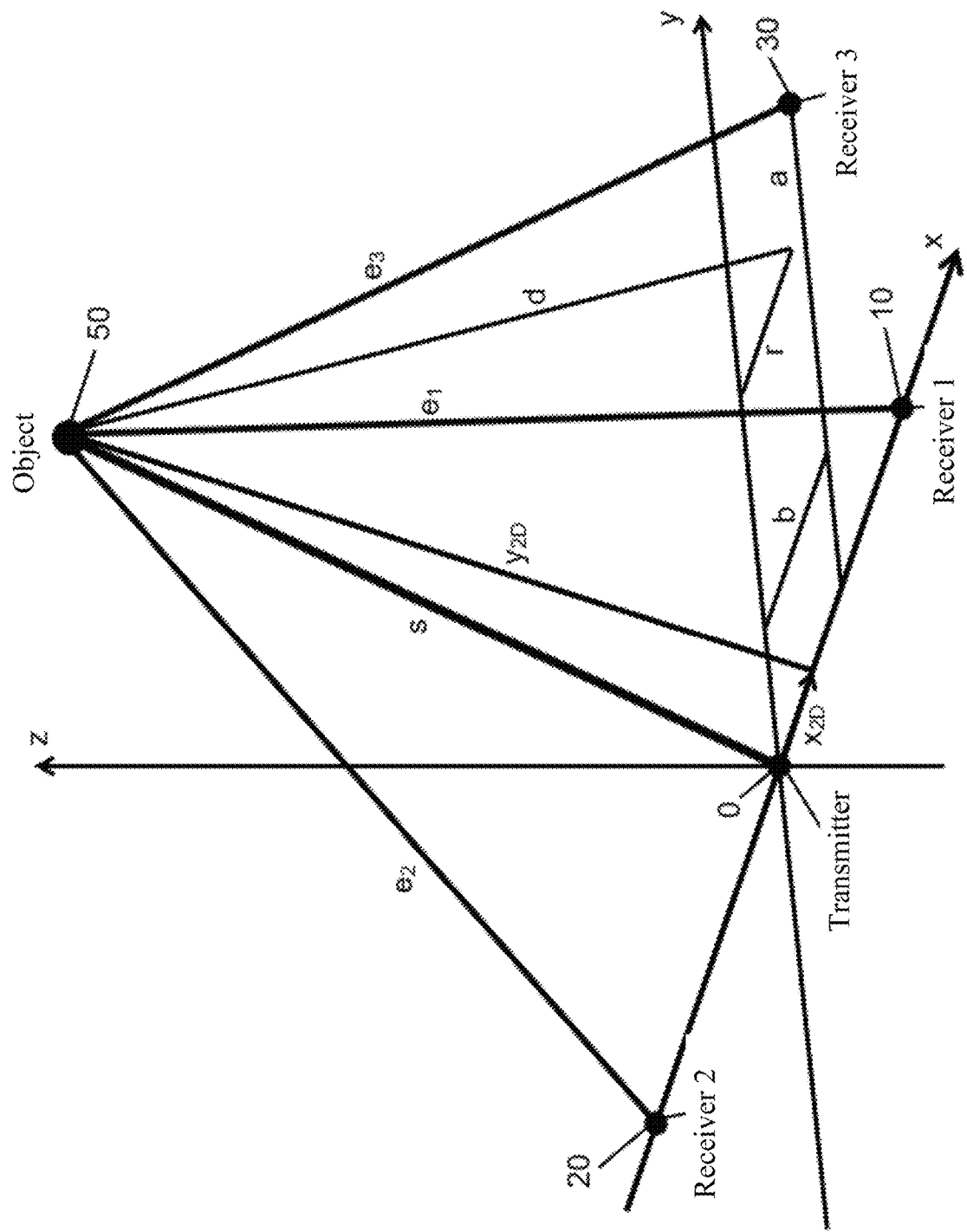
Figure 3A:
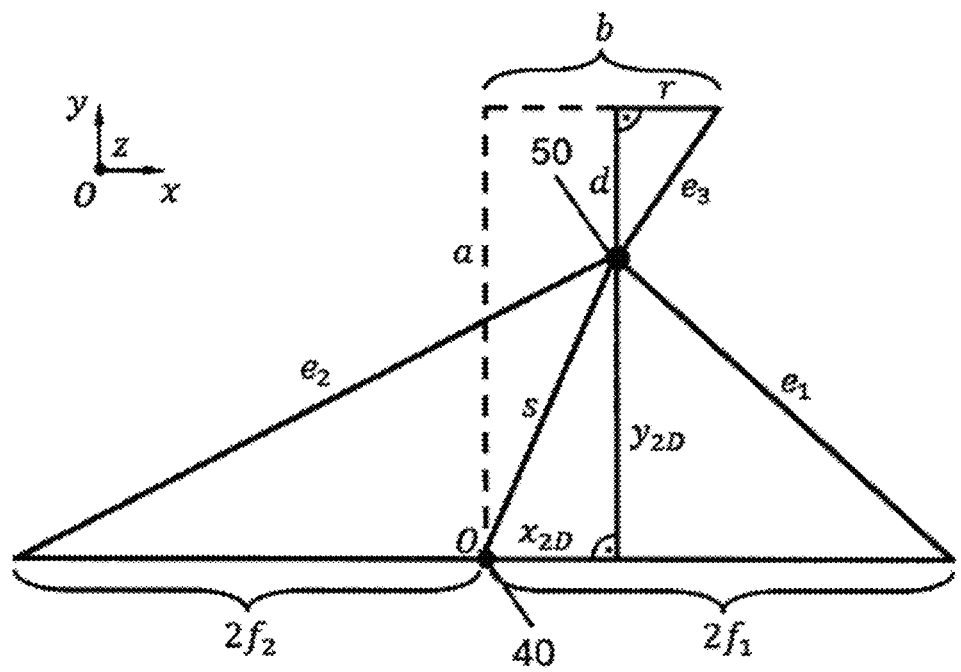
Figure 3B:
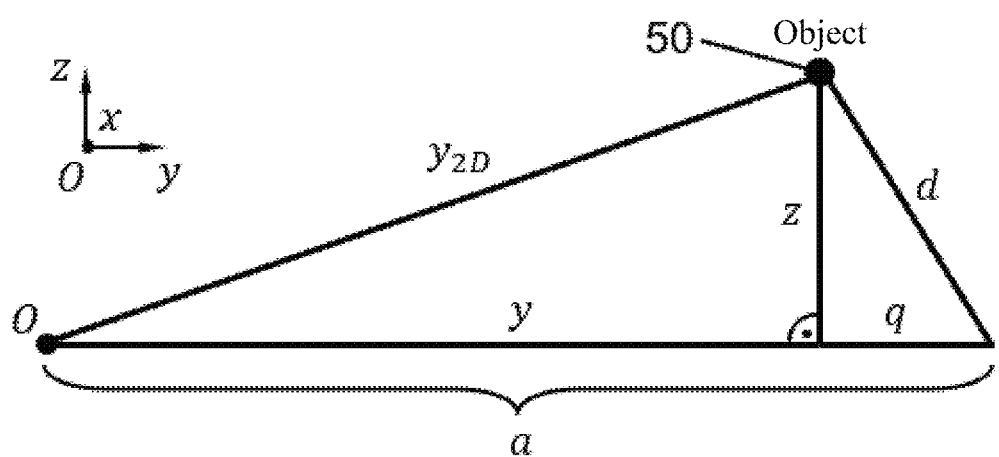
Figure 4:
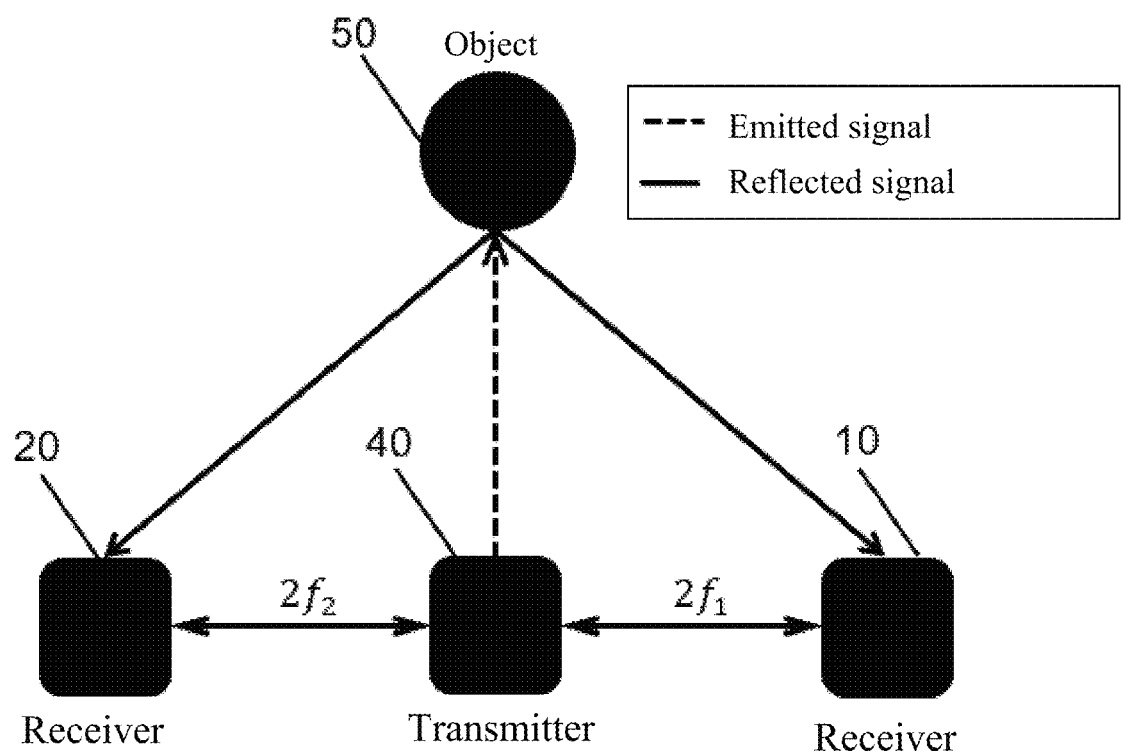
Figure 5A:
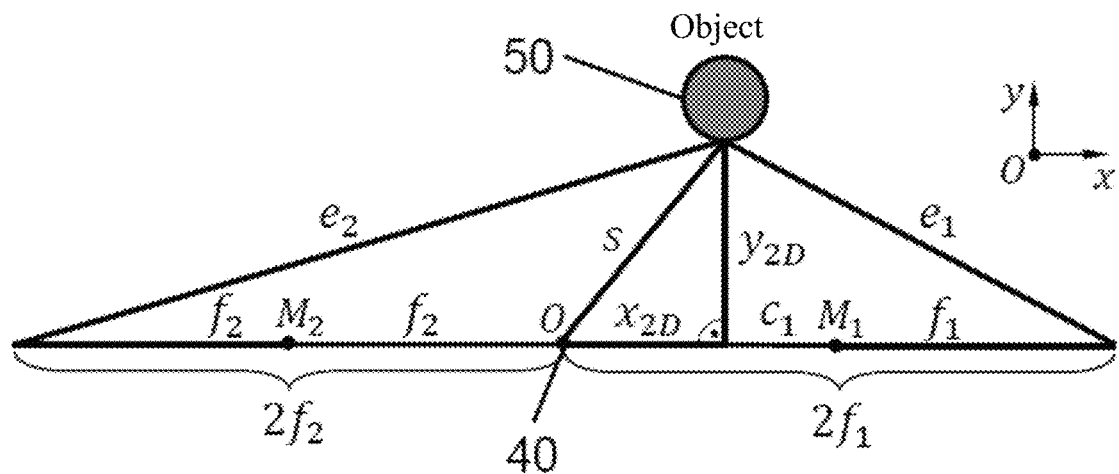
Figure 5B:
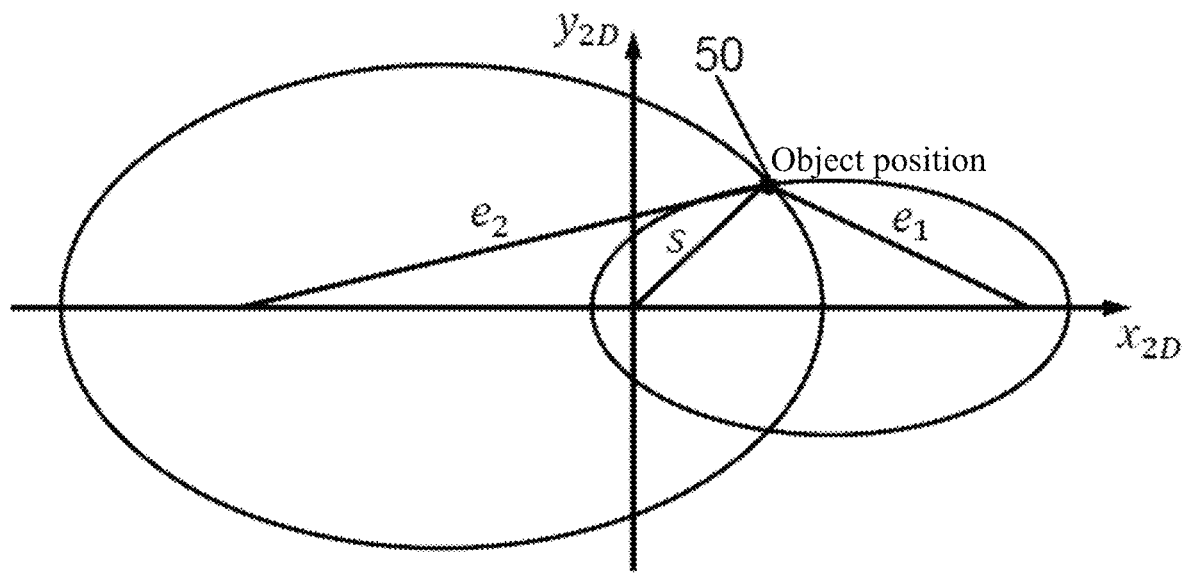
Figure 6:
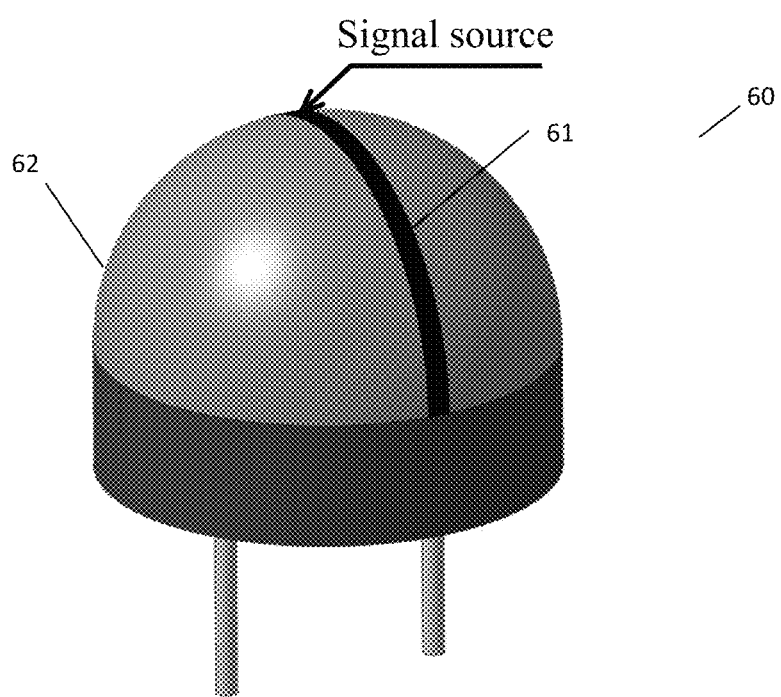
Figure 7:
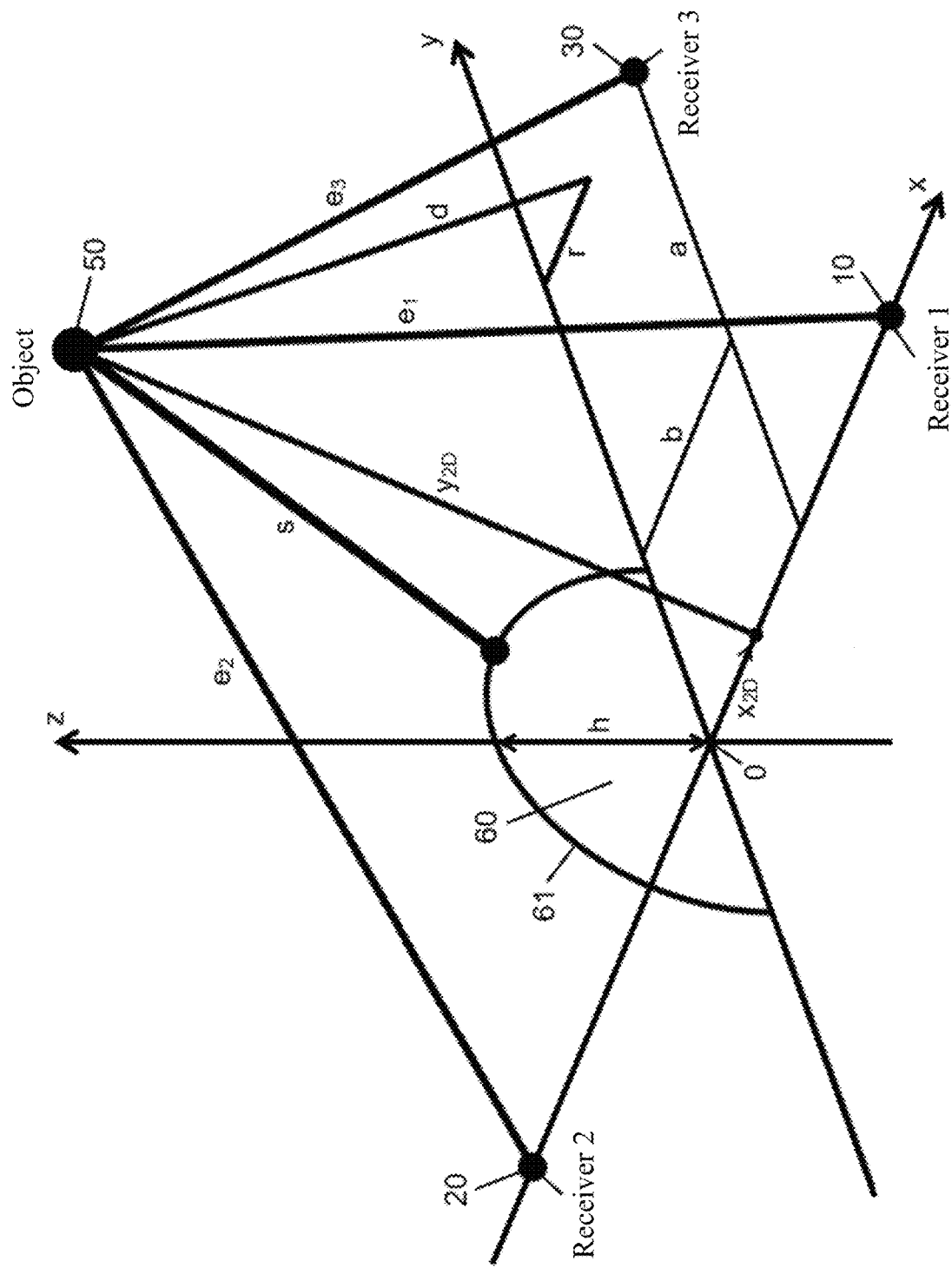
Figure 8A:
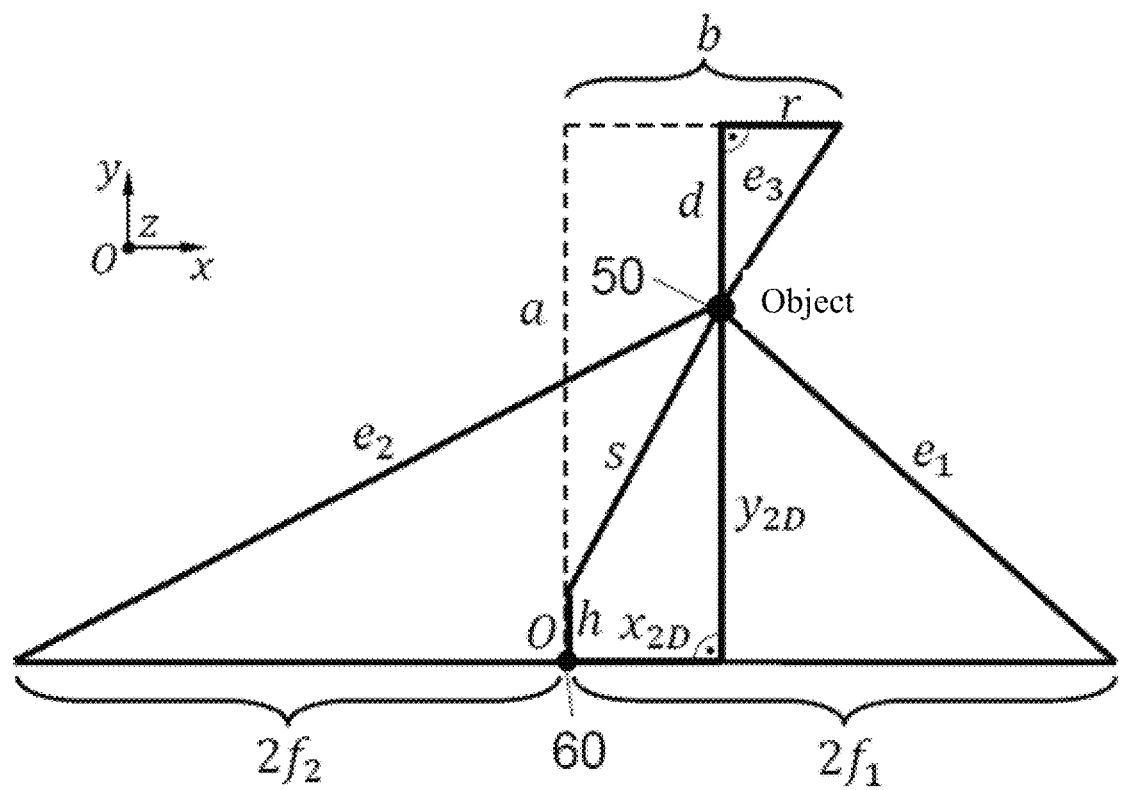
Figure 8B:
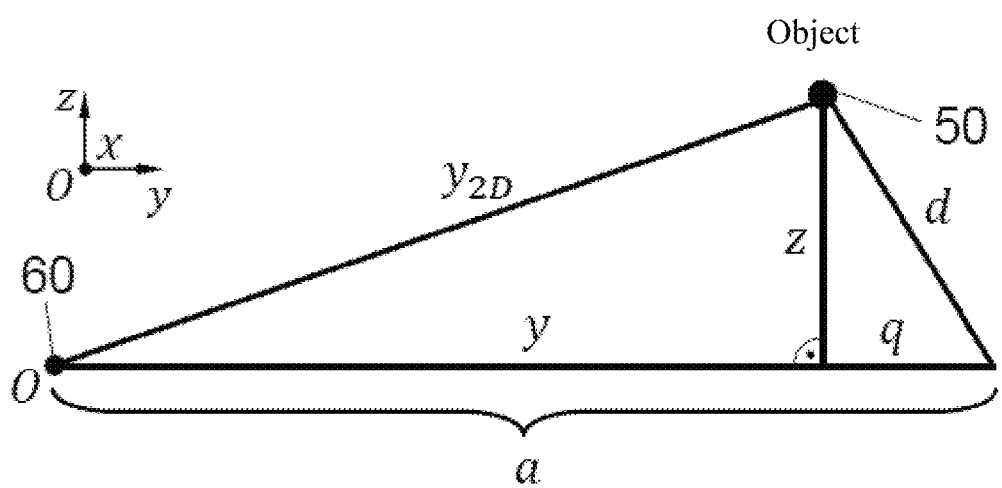
Figure 9:
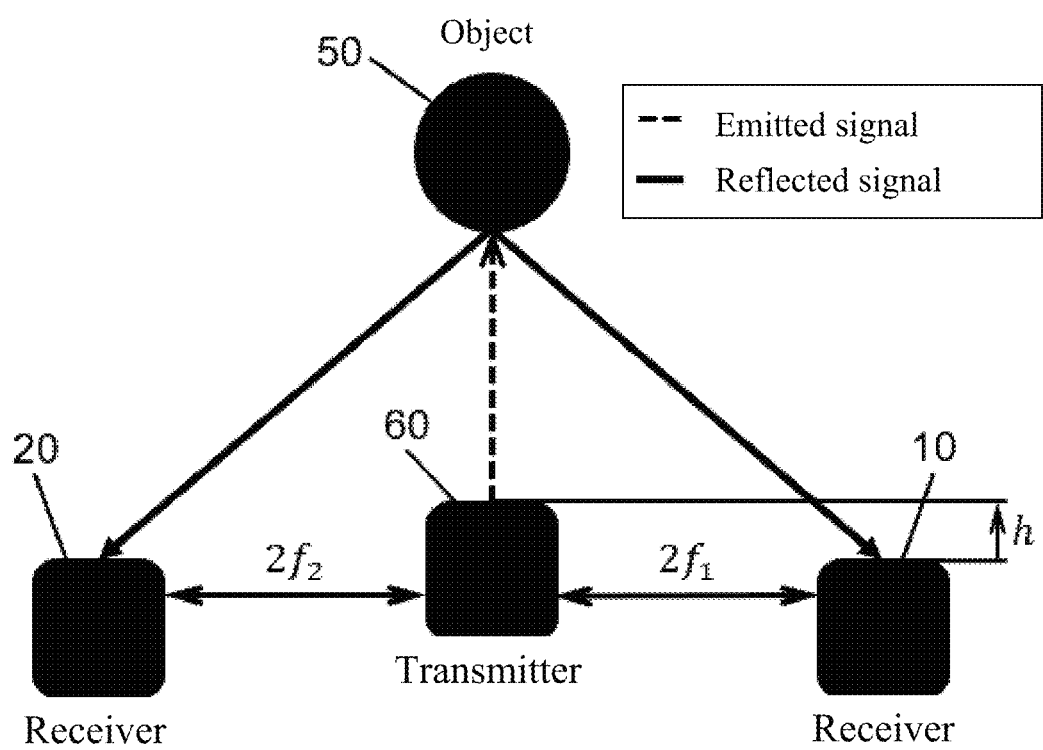
Figure 10A:
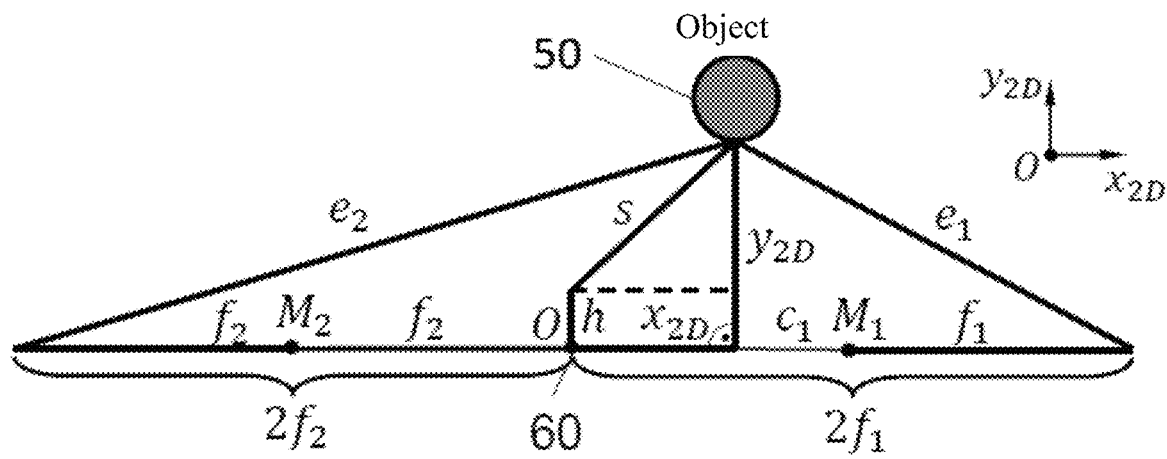
Figure 10B:
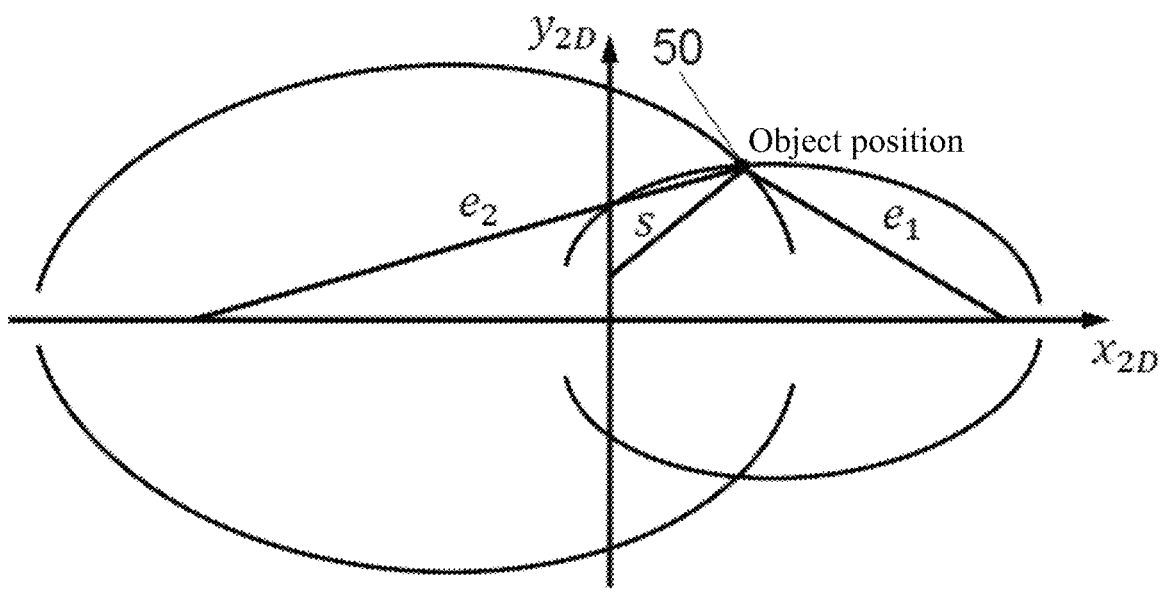
Figure 11:
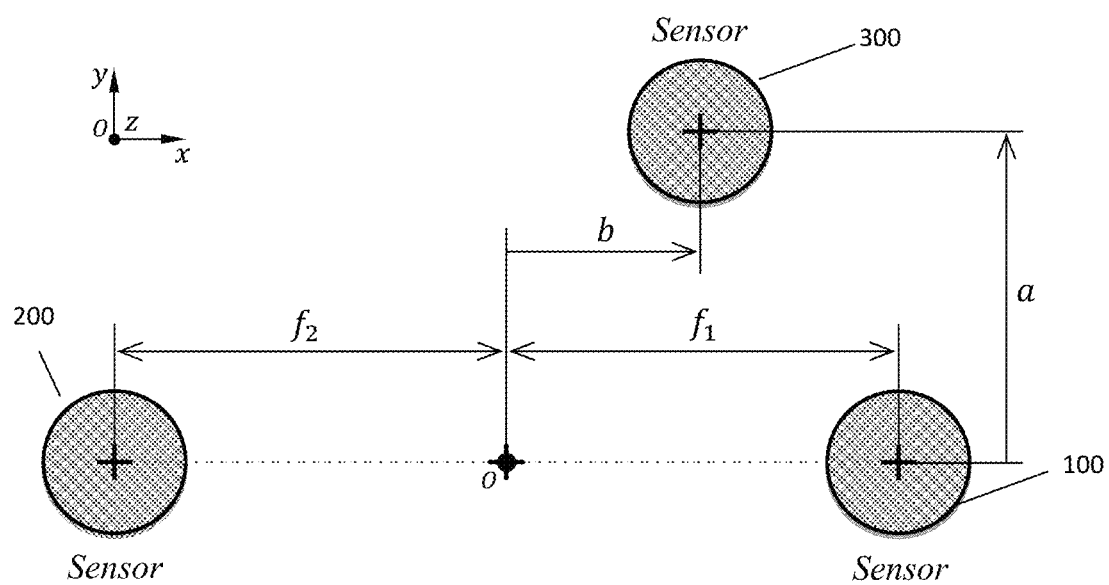
Figure 12:
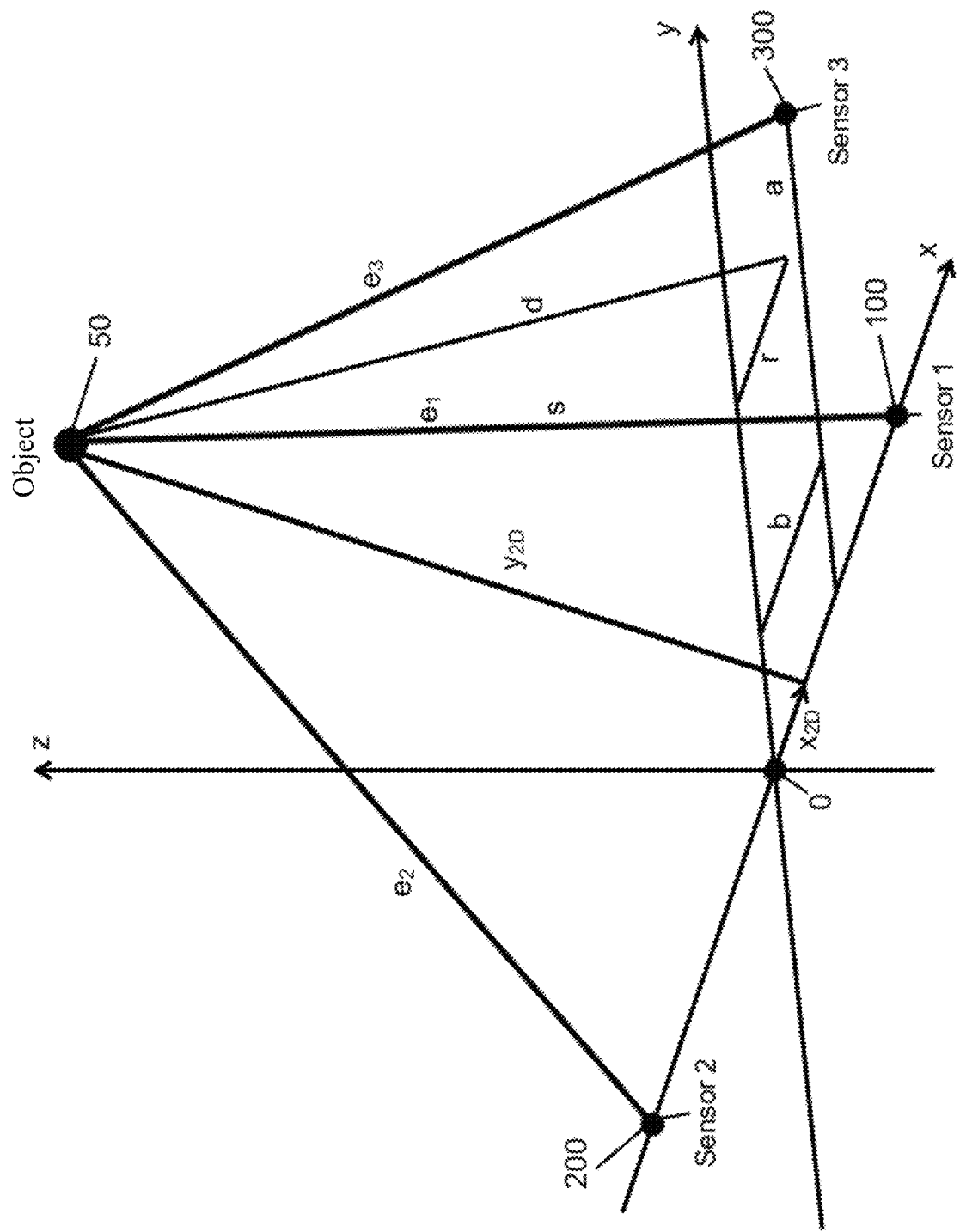
Figure 13A:
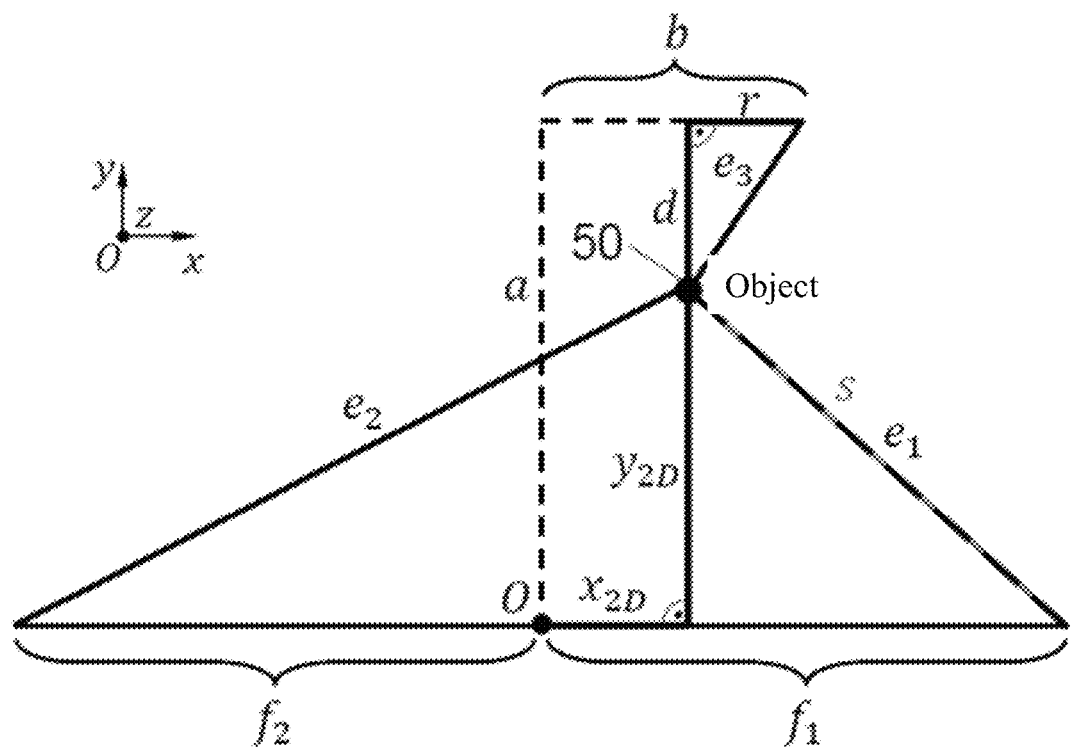
Figure 13B:
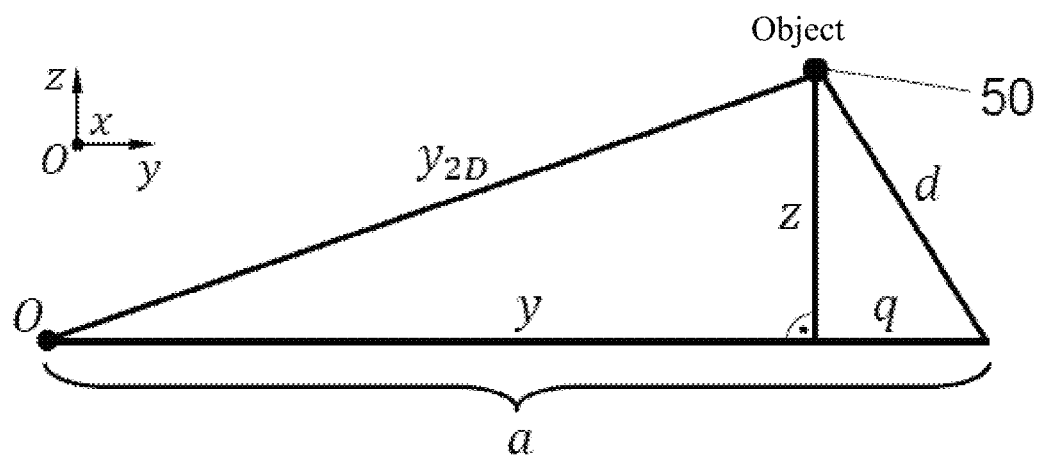
Figure 14:
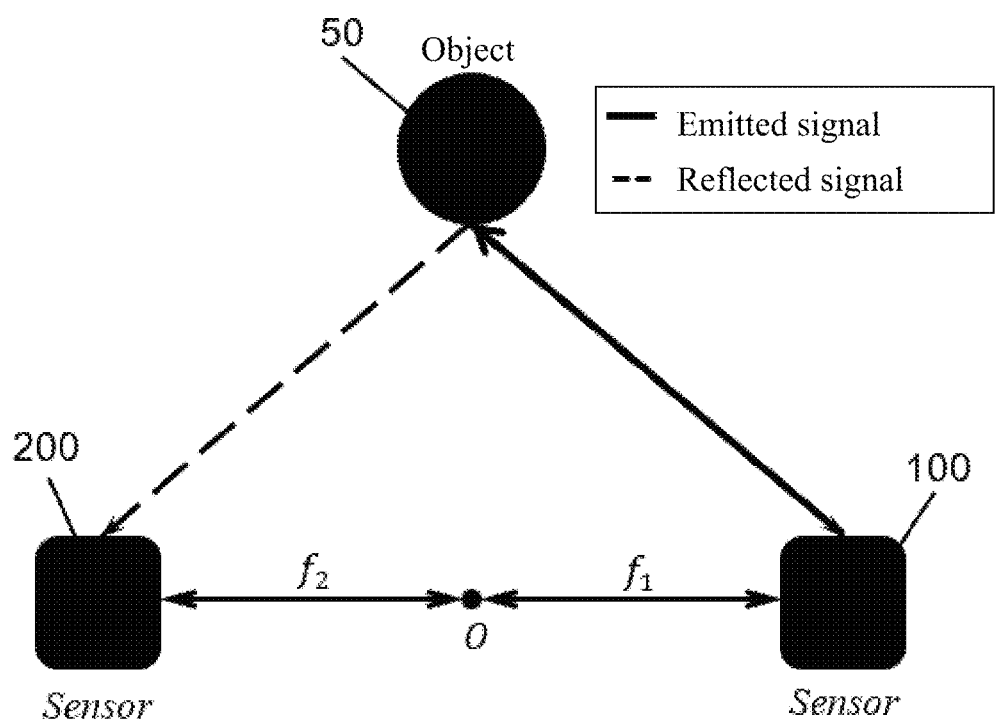
Figure 15A:
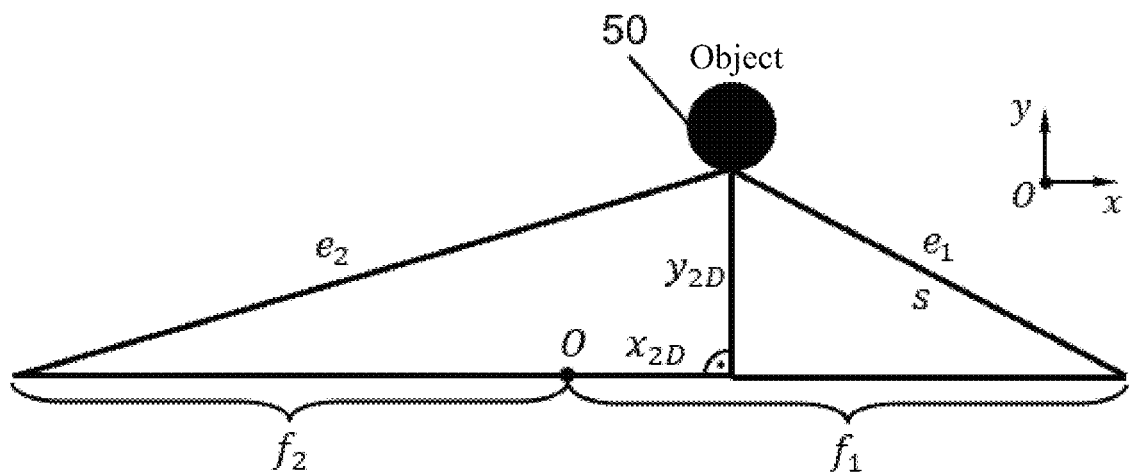
Figure 15B:
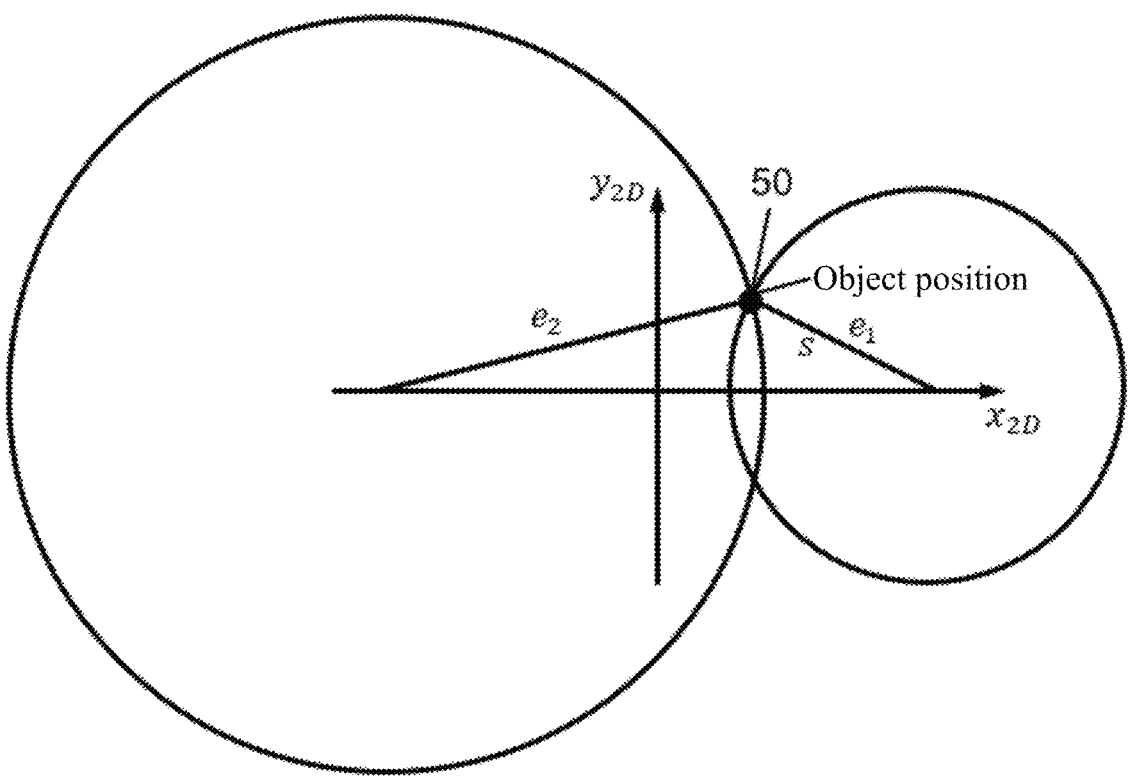
Figure 16:
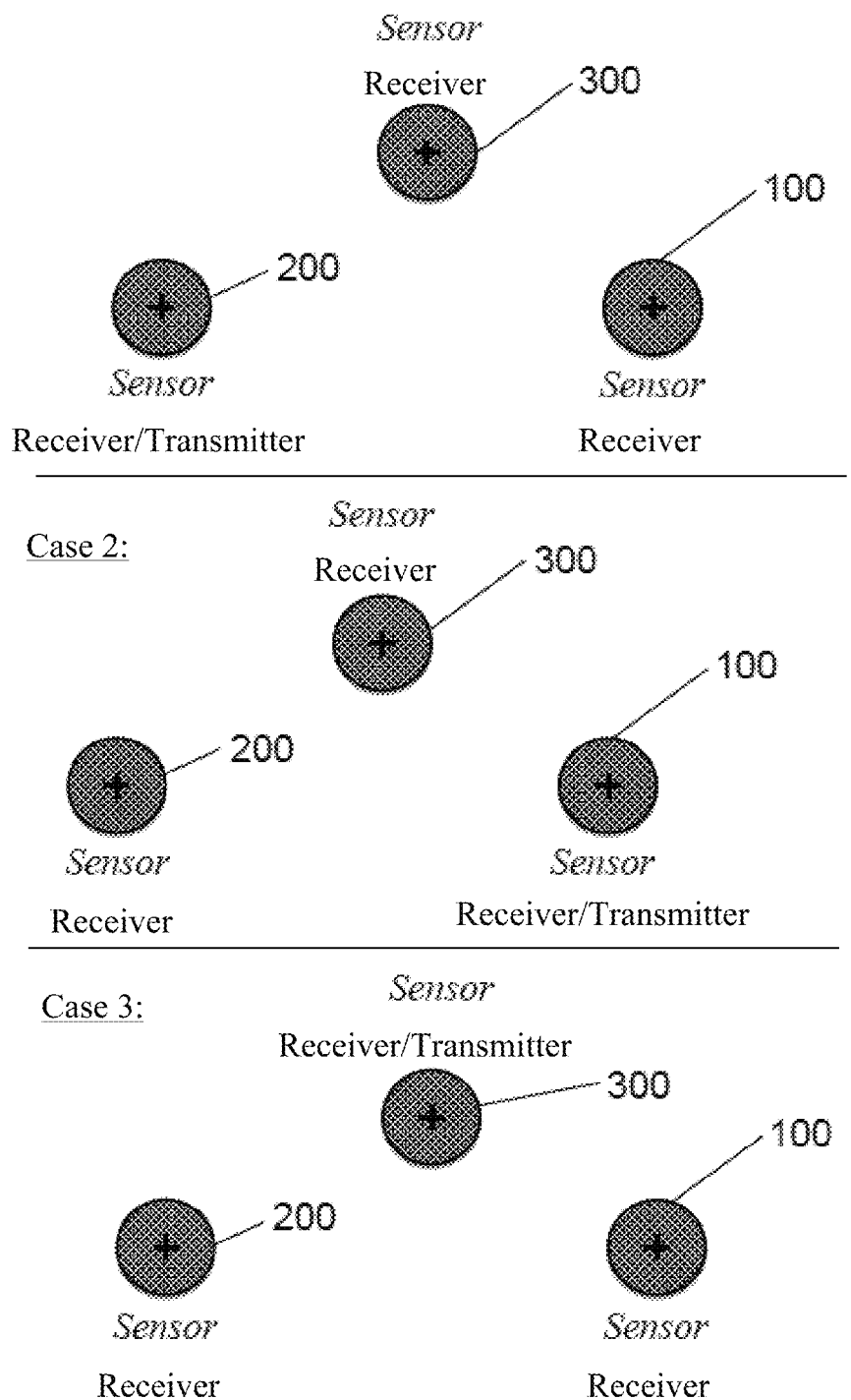
Figure 17:
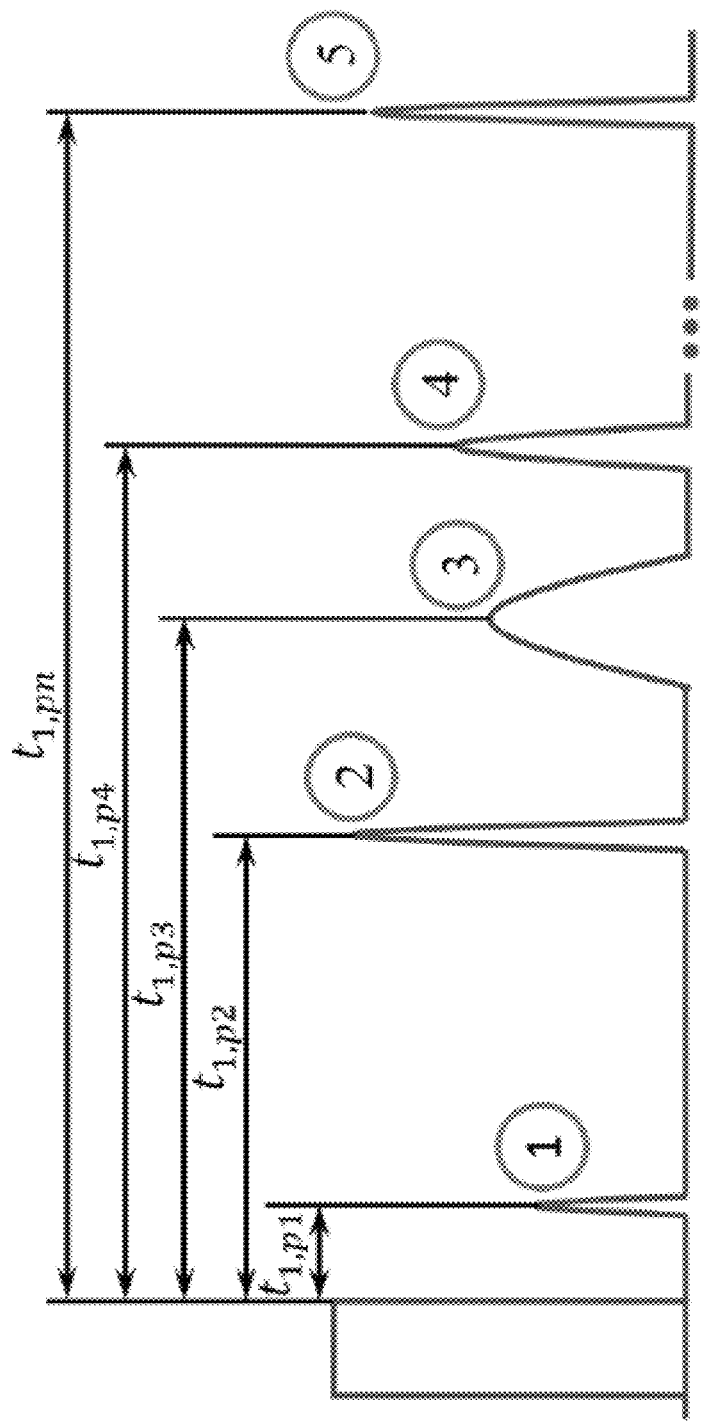
Figure 18:
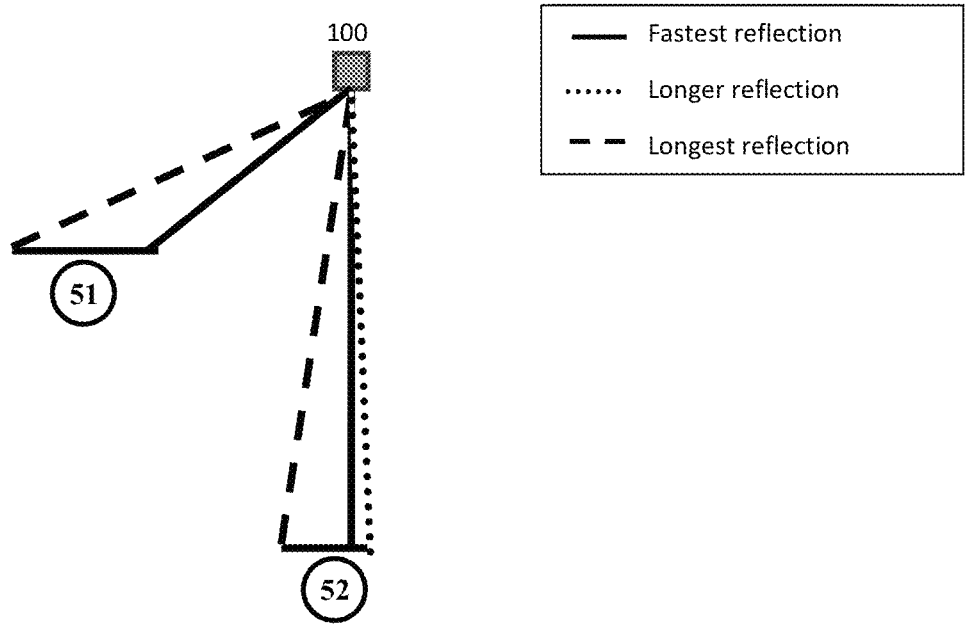
Figure 19:
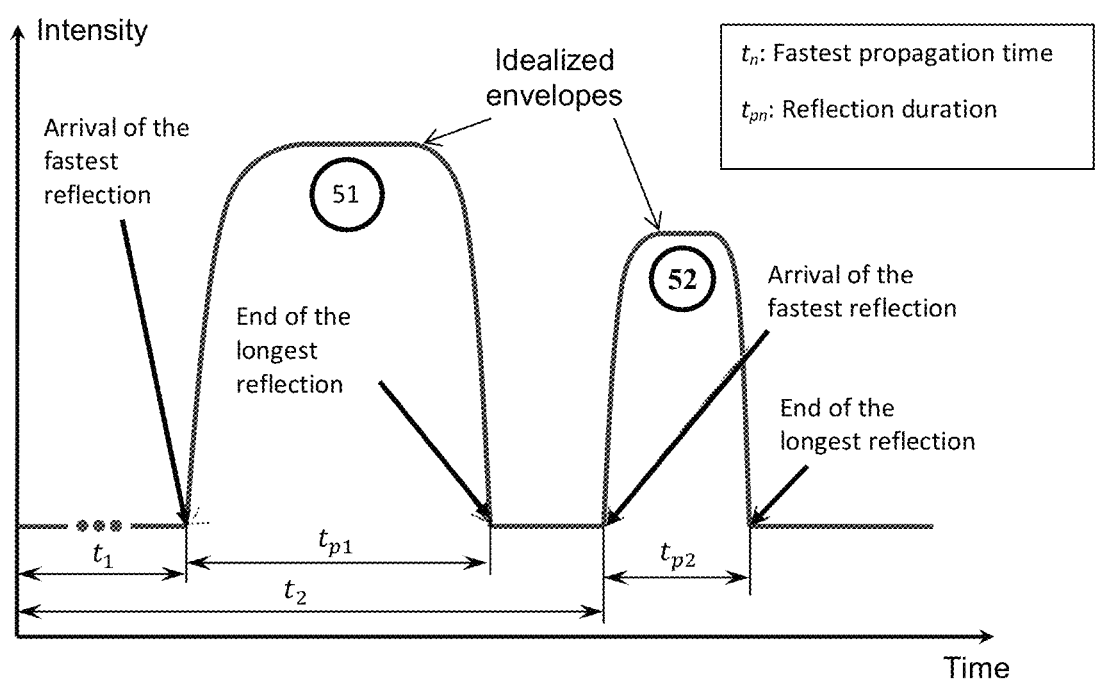
Figure 20:
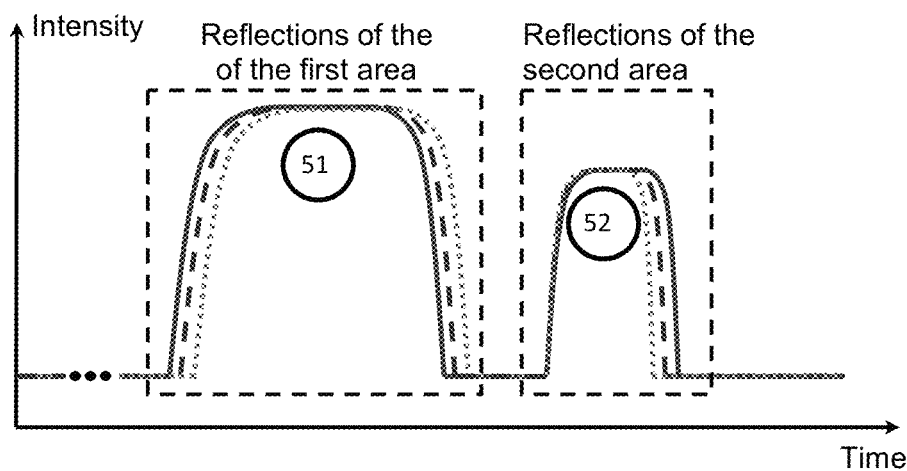
Figure 21:
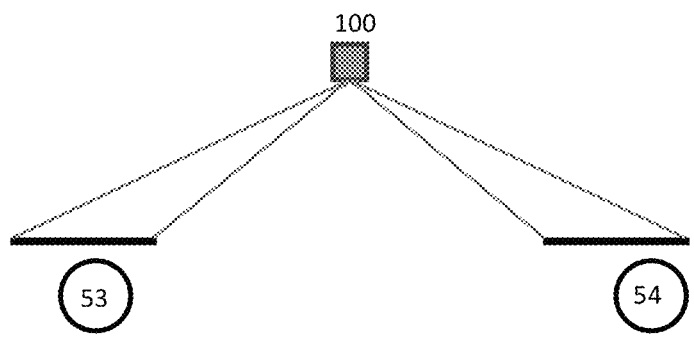
Figure 22:
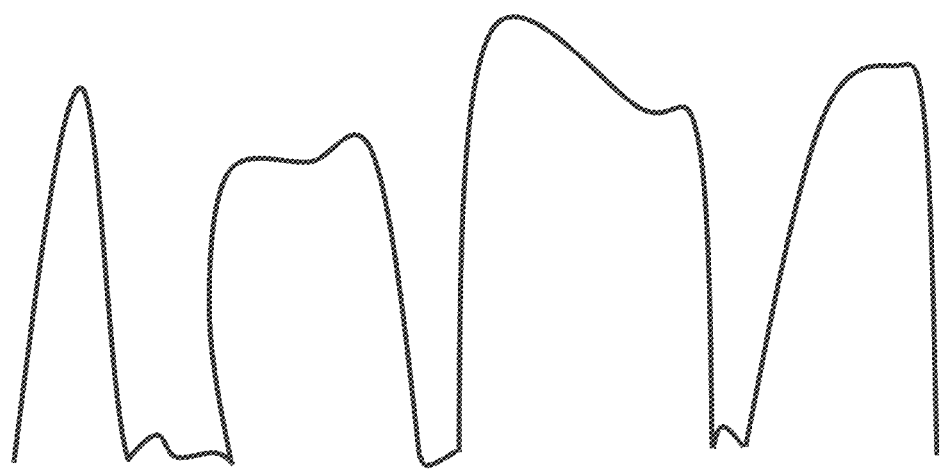

In the following, the present invention is explained in more detail by means of exemplary embodiments and the Figures, in which:

FIG. 1 shows a schematic top view of a sensor arrangement according to a first embodiment of the invention, FIG. 2 shows a schematic 3D view of the geometric construct for three propagation time measurements by reflection according to the first embodiment of the invention, FIG. 3a shows a schematic top view of the geometric construct for three propagation time measurements by reflection according to the first embodiment of the invention, FIG. 3b shows a schematic geometric construct of two auxiliary distances according to the first embodiment of the invention, FIG. 4 shows a schematic illustration of a propagation time measurement using two receivers according to the first embodiment of the invention, FIG. 5a shows a schematic geometric construct for two propagation time measurements by reflection according to the first embodiment of the invention, FIG. 5b shows a schematic illustration for the determination of the positions of the object on two elliptical orbits according to the first embodiment of the invention, FIG. 6 shows a schematic illustration of a possible structure of a semicircular transmitter according to a second embodiment of the invention, FIG. 7 shows a schematic 3D view of the geometric construct for three propagation time measurements by reflection using a semicircular transmitter according to the second embodiment of the invention, FIG. 8a shows a schematic top view of the geometric construct for three propagation time measurements by reflection using a semicircular transmitter according to the second embodiment of the invention, FIG. 8b shows a schematic illustration of the geometric construct of two auxiliary distances according to the second embodiment of the invention, FIG. 9 shows a schematic illustration of the propagation time measurement using two receivers and a semicircular transmitter according to the second embodiment of the invention, FIG. 10a shows a schematic illustration of the geometric construct for two propagation time measurements by reflection using the semicircular transmitter according to the second embodiment of the invention, FIG. 10b shows a schematic illustration of the possible positions of the object on four tilted semielliptical orbits according to the second embodiment of the invention, FIG. 11 shows a schematic top view of a sensor arrangement according to the third embodiment of the invention, FIG. 12 shows a schematic 3D view of the geometric construct for three propagation time measurements by reflection according to the third embodiment of the invention, FIG. 13a shows a schematic top view of the geometric construct of FIG. 12 according to the third embodiment of the invention, FIG. 13b shows a schematic illustration of the geometric construct of FIG. 12 according to the third embodiment of the invention, FIG. 14 shows a schematic illustration for the propagation time measurement using two receivers according to the third embodiment of the invention, FIG. 15a shows a schematic illustration of the geometric construct for two propagation time measurements by reflection according to the third embodiment of the invention, FIG. 15b shows a schematic illustration of the possible positions of the object on two circular orbits according to the third embodiment of the invention, FIG. 16 shows a schematic illustration for switching through the transmission functionality of the sensors according to the third embodiment of the invention, FIG. 17 shows a schematic illustration of the received signals according to a further embodiment of the invention, FIG. 18 shows a schematic illustration of the reflection at two extensive objects, FIG. 19 shows a schematic illustration of the signals received by the two objects according to FIG. 18, FIG. 20 shows a schematic illustration of the signals received by the two objects according to FIG. 18, FIG. 21 shows a schematic illustration of the reflection at two extensive objects and FIG. 22 shows a schematic illustration of a rough surface.

FIG. 1 shows the schematic structure of a first embodiment of the present invention comprising a first receiver 10, a second receiver 20, a third receiver 30 and a transmitter 40. The relationships between the individual components are also shown and explained in more detail in the following.

According to this embodiment, the transmitter 40 and the three receivers 10, 20, 30 are preferably at the same height (i.e., preferably within a first plane which is characterized here by z=0). The receiver 10 and the receiver 20 are preferably positioned in a row (i.e., preferably along a first straight line) with the transmitter 40 (preferably on the dashed line), i.e., here preferably on the x-axis (i.e., y=0 and z=0). The first receiver 10 has a distance $2f_1$ from the transmitter 40 and the second receiver 20 has also a distance $2f_2$ from the transmitter 40. The distances can have different sizes, i.e. $2f_1 \neq 2f_2$, as well as have the same size, i.e., $2f_1 = 2f_2$. In the x-direction the receiver 30 can have the distance b and in the y-direction the distance a from the coordinate origin O (here the position of the transmitter 40). The distances a and b can have any value. However, a should preferably be unequal to zero, i.e., the third receiver should preferably not be arranged on the x-axis. In other words, the receiver 30 should preferably be arranged at a distance from the first x-axis. Even if in FIG. 1 a mathematically correct positioning within one plane or along one straight line is assumed, it will be clear to the person skilled in the art that small deviations thereof, which may result from manufacturing tolerances etc., cannot entail the exclusion from the scope of protection of the invention. Even though the accuracy of the positioning of the individual system components has an influence on the accuracy of the determined position, the position of an object can even be determined with sufficient accuracy if the components 10, 20, 30 and 40 are arranged essentially within a plane and/or if the components 10, 20 and 40 are arranged essentially along a straight line.

FIG. 2 shows a schematic illustration of the first embodiment in a three-dimensional view. According to FIG. 2, the transmitter 40, the receivers 10, 20, 30 as well as the object 50 are schematically illustrated. FIG. 2 further shows the distance s that the signal covers from the transmitter 40 to the object 50. The distances $e_1$, $e_2$, $e_3$ according to FIG. 2 are the distances that the signal reflected at the object 50 travels to the respective receivers. The further indicated distances $x_{2D}$, $y_{2D}$, d, r, a, b are used and described in more detail in the following.

According to the first embodiment of the present invention, three propagation time measurements are carried out for the determination of the three-dimensional position of the object 50. The three propagation time measurements are carried out by means of the transmitter 40 and the three receivers 10, 20, 30. The transmitter 40 emits a signal (the distance s denotes the way of the fastest signal from the transmitter 40 to the object 50, i.e. theoretically a wave or a particle stream is emitted. The distance s is the shortest propagation time and thus the first reflected signal at the object.) that propagates in the three-dimensional space until it hits an object 50 and is partly reflected and/or scattered at it. The reflected and/or scattered parts of the signal hit the three receivers 10, 20, 30 (along the distances $e_1$, $e_2$, $e_3$). This yields the three propagation times that result from the propagation time from the transmitter 40 to the object 50 together with the propagation times from the object 50 to the individual receivers 10, 20, 30 (propagation time measurement).

The consideration of the distance s that the signal travels from the transmitter 40 to the object 50 and of the individual distances $e_1$, $e_2$ and $e_3$ that the signal travels from the object 50 to the respective receivers 10, 20, 30 leads to the three-dimensional geometric construct shown in FIG. 2 along with the auxiliary distances $x_{2D}$, $y_{2D}$, d, r, a, b.

FIGS. 3a and 3b illustrate the geometric construct in a top view (FIG. 3a: top view of the z-axis) and in a side view (FIG. 3b: top view of the x-axis). FIG. 3b additionally depicts auxiliary distances q, y and the coordinate z.

The two auxiliary distances $y_{2D}$ and d are always perpendicular to the x-axis and are connected with the object at the top. These auxiliary distances, together with the distance a, form a triangular structure (see FIGS. 3a and 3b).

The geometrical construct provides the following equation:

$$a = \sqrt{d^2 - z^2} + \sqrt{y_{2D}^2 - z^2} \tag{1}$$

When the equation (1) for the distance a is solved for z, the following equation is obtained for the z-coordinate of the object 50 in the three-dimensional space:

$$z = \pm \frac{1}{2} \sqrt{\frac{2 y_{2D}^2 a^2 - y_{2D}^4 - d^4 + 2 d^2 y_{2D}^2 + 2 d^2 a^2 - a^4}{a}} \tag{2}$$

wherein the equation (2) has a positive sign with a>0 and a negative sign with a<0 (for the upper position of the object 50, i.e. above the plane in which the receivers 10, 20, 30 and the transmitter 40 are located). When the object 50 is below the plane in which the receivers 10, 20, 30 and the transmitter 40 are located, the sign is reversed.

The auxiliary distance d in the equation (2) corresponds to the following equation:

$$d = \sqrt{\left(U_{se3} - \sqrt{x_{2D}^2 + y_{2D}^2}\right)^2 - (b - x_{2D})^2} \tag{3}$$

The determination of the x-coordinate of the object in the three-dimensional space is performed by means of the following equation.

$$x = \frac{1}{4} \frac{-4 f_2^2 U_{se1} + 4 f_1^2 U_{se2} - U_{se2} U_{se1}^2 + U_{se1} U_{se2}^2}{f_2 U_{se1} + f_1 U_{se2}} \tag{4}$$

The distances $U_{se1}$, $U_{se2}$ and $U_{se3}$ are distances generated by the propagation time (sum of the distance s and the respective distance $e_n$). These distances are determined via the propagation speed c of the signal and the propagation times $t_1$, $t_2$ and $t_3$ that the signal requires from the transmitter 40 to the respective receiver 10, 20, 30 as follows:

$$U_{sen} = c \, t_n \tag{5}$$

The determination of the y-coordinate of the object in the three-dimensional space is performed by means of the following equation:

$$y = \pm\sqrt{y_{2D}^2 - z^2} \quad (6)$$

wherein the equation (6) for the y-coordinate in the three-dimensional space has a positive sign with y>q−|a| and a>0, as well as with y≤q−|a| and a<0. The equation (6) has a negative sign with all other value ranges.

The auxiliary distance q mentioned in connection with the case distinction is calculated as follows:

$$q = \sqrt{d^2 - z^2} \quad (7)$$

The auxiliary distances $x_{2D}$ and $y_{2D}$ mentioned in the above equations are the x-coordinate and y-coordinate of the object 50 in the case of the position determination of the object 50 in the two-dimensional space (where applicable in the second plane).

According to the first embodiment of the present invention, a transmitter 40 and two receivers 10, 20 of the three receivers 10, 20, 30 are required for the determination of the x-coordinate and y-coordinate ($x_{2D}$ and $y_{2D}$) of the object 50 in the two-dimensional space. This is schematically illustrated in FIG. 4. The geometric construct depicted in FIG. 5a is generated in this arrangement. Two elliptical orbits (see FIG. 5b) are formed by the two propagation time distances $e_1$ and $e_2$. According to FIG. 5b, the position of the object 50 is in the intersection of the two elliptical orbits. The two first focal points of the two elliptical orbits coincide exactly at the position of the transmitter 40 (origin of the distance s).

The following equations for the two propagation time distances ($U_{se1}$ and $U_{se2}$) result from the geometric constructs according to FIGS. 5a and 5b:

$$U_{se1} = \sqrt{y_{2D}^2 + x_{2D}^2} + \sqrt{y_{2D}^2 + (2f_1 - x_{2D})^2} \quad (8)$$

and $$U_{se2} = \sqrt{y_{2D}^2 + x_{2D}^2} + \sqrt{y_{2D}^2 + (2f_2 + x_{2D})^2} \quad (9)$$

When the equation (8) for the propagation time distance $U_{se1}$ is solved for $y_{2D}$, the following equation is obtained:

$$y_{2D} = \pm\frac{1}{2}\frac{\sqrt{-(-4f_1^2 + U_{se1}^2)(-U_{se1}^2 + 4x_{2D}^2 + 4f_1^2 - 8f_1 x_{2D})}}{U_{se1}} \quad (10)$$

When the equation (9) for the propagation time distance $U_{se2}$ is solved for $y_{2D}$, the following equation is obtained:

$$y_{2D} = \pm\frac{1}{2}\frac{\sqrt{-(-4f_2^2 + U_{se2}^2)(-U_{se2}^2 + 4x_{2D}^2 + 4f_2^2 - 8f_2 x_{2D})}}{U_{se2}} \quad (11)$$

The equations, with a positive sign, for the semielliptical orbits (10) and (11) are equated and zeroed:

$$\pm\frac{1}{2}\frac{\begin{pmatrix} U_{se2}\sqrt{-(-4f_1^2 + U_{se1}^2)(-U_{se1}^2 + 4x_{2D}^2 + 4f_1^2 - 8f_1 x_{2D})} - \\ U_{se1}\sqrt{-(-4f_2^2 + U_{se2}^2)(-U_{se2}^2 + 4x_{2D}^2 + 4f_2^2 + 8f_2 x_{2D})} \end{pmatrix}}{U_{se1}U_{se2}} = 0 \quad (12)$$

After solving the equation (12) for $x_{2D}$, i.a., the following equation is obtained:

$$x_{2D} = \frac{1}{4}\frac{-4f_2^2 U_{se1} + 4f_1^2 U_{se2} - U_{se2}U_{se1} + U_{se1}U_{se2}^2}{f_2 U_{se1} + f_1 U_{se2}} \quad (13)$$

It should be noted that the equation (13) for the x-component in the two-dimensional space corresponds to the equation of the x-component (equation (4)) in the three-dimensional space. When the equations for $x_{2D}$ and $y_{2D}$ for the positive semielliptical orbit (+) are inserted into the equation (2) for the three-dimensional z-coordinate and into the equation (6) for the three-dimensional y-coordinate, the following equation (14) and equation (15) are obtained:

$$z = \pm\frac{1}{32a}\sqrt{\begin{array}{l} -\dfrac{32(-4f_2^2 + U_{se2}^2)(-4f_1^2 + U_{se1}^2)(U_{se2}^2 - 2U_{se1}U_{se2} - 8f_1 f_2 + U_{se1}^2 - 4f_1^2 - 4f_2^2)a^2}{(U_{se2}f_1 + U_{se1}f_2)^2} - \\ \dfrac{(-4f_2^2 + U_{se2}^2)^2(-4f_1^2 + U_{se1}^2)^2(U_{se2}^2 - 2U_{se1}U_{se2} - 8f_1 f_2 + U_{se1}^2 - 4f_1^2 - 4f_2^2)^2}{(U_{se2}f_1 + U_{se1}f_2)^4} - \\ \dfrac{1}{(U_{se2}f_1 + U_{se1}f_2)^2}\left(256\left(\begin{pmatrix} \left(U_{se3} - \dfrac{1}{2}\sqrt{\dfrac{(-4f_1^2 f_2 - 4f_1 f_2^2 + f_1 U_{se2}^2 + U_{se1}^2 f_2)^2}{(U_{se2}f_1 + U_{se1}f_2)^2}}\right)^2 - \\ \left(b + \dfrac{U_{se2}U_{se1}^2 - U_{se2}^2 U_{se1} - 4U_{se2}f_1^2 + 4U_{se1}f_2^2}{4(U_{se2}f_1 + U_{se1}f_2)}\right)^2 \end{pmatrix}\right) \\ 32\left(\begin{pmatrix} \left(U_{se3} - \dfrac{1}{2}\sqrt{\dfrac{(-4f_1^2 f_2 - 4f_1 f_2^2 + f_1 U_{se2}^2 + U_{se1}^2 f_2)^2}{(U_{se2}f_1 + U_{se1}f_2)^2}}\right)^2 - \\ \left(b + \dfrac{U_{se2}U_{se1}^2 - U_{se2}^2 U_{se1} - 4U_{se2}f_1^2 + 4U_{se1}f_2^2}{4(U_{se2}f_1 + U_{se1}f_2)}\right)^2 \end{pmatrix}\right) \\ (-4f_2^2 + U_{se2}^2)(-4f_1^2 + U_{se1}^2)(U_{se2}^2 - 2U_{se1}U_{se2} - 8f_1 f_2 + U_{se1}^2 - 4f_1^2 - 4f_2^2)) \\ 512\left(\begin{pmatrix} \left(U_{se3} - \dfrac{1}{2}\sqrt{\dfrac{(-4f_1^2 f_2 - 4f_1 f_2^2 + f_1 U_{se2}^2 + U_{se1}^2 f_2)^2}{(U_{se2}f_1 + U_{se1}f_2)^2}}\right)^2 - \\ \left(b + \dfrac{U_{se2}U_{se1}^2 - U_{se2}^2 U_{se1} - 4U_{se2}f_1^2 + 4U_{se1}f_2^2}{4(U_{se2}f_1 + U_{se1}f_2)}\right)^2 \end{pmatrix}\right)a^2 - 256a^4 \end{array}} \quad (14)$$

$$y = \pm \frac{1}{32} \sqrt{\frac{1}{a^2}\left[\begin{array}{c} -\frac{64(-4f_2^2+U_{se2}^2)(-4f_1^2+U_{se1}^2)(U_{se2}^2-2U_{se1}U_{se2}-8f_1f_2+U_{se1}^2-4f_1^2-4f_2^2)}{(U_{se2}f_1+U_{se1}f_2)^2} \\ \left(\begin{array}{c} -\frac{32(-4f_2^2+U_{se2}^2)(-4f_1^2+U_{se1}^2)(U_{se2}^2-2U_{se1}U_{se2}-8f_1f_2+U_{se1}^2-4f_1^2-4f_2^2)a^2}{(U_{se2}f_1+U_{se1}f_2)^2} \\ -\frac{(-4f_2^2+U_{se2}^2)^2(-4f_1^2+U_{se1}^2)^2(U_{se2}^2-2U_{se1}U_{se2}-8f_1f_2+U_{se1}^2-4f_1^2-4f_2^2)^2}{(U_{se2}f_1+U_{se1}f_2)^4} \\ 256\left(\left(U_{se3}-\frac{1}{2}\sqrt{\frac{(-4f_1^2f_2-4f_1f_2^2+f_1U_{se2}^2+U_{se1}^2f_2)^2}{(U_{se2}f_1+U_{se1}f_2)^2}}\right)^2 - \right)^2 - \\ \left(b+\frac{U_{se2}U_{se1}^2-U_{se2}^2U_{se1}-4U_{se2}f_1^2+4U_{se1}f_2^2}{4(U_{se2}f_1+U_{se1}f_2)}\right)^2 \end{array}\right) - \\ \frac{1}{(U_{se2}f_1+U_{se1}f_2)^2}\left(\begin{array}{c} 32\left(\left(U_{se3}-\frac{1}{2}\sqrt{\frac{-4f_1^2f_2-4f_1f_2^2+f_1U_{se2}^2+U_{se1}^2f_2)^2}{(U_{se2}f_1+U_{se1}f_2)^2}}\right)^2 - \right) \\ \left(b+\frac{U_{se2}U_{se1}^2-U_{se2}^2U_{se1}-4U_{se2}f_1^2+4U_{se1}f_2^2}{4(U_{se2}f_1+U_{se1}f_2)}\right)^2 \\ (-4f_2^2+U_{se2}^2)(-4f_1^2+U_{se1}^2)(U_{se2}^2-2U_{se1}U_{se2}-8f_1f_2+U_{se1}^2-4f_1^2-4f_2^2) \end{array}\right) + \\ 512\left(\left(U_{se3}-\frac{1}{2}\sqrt{\frac{(-4f_1^2f_2-4f_1f_2^2+f_1U_{se2}^2+U_{se1}^2f_2)^2}{(U_{se2}f_1+U_{se1}f_2)^2}}\right)^2 - \right)a^2 - 256a^4 \\ \left(b+\frac{U_{se2}U_{se1}^2-U_{se2}^2U_{se1}-4U_{se2}f_1^2+4U_{se1}f_2^2}{4(U_{se2}f_1+U_{se1}f_2)}\right)^2 \end{array}\right]} \quad (15)$$

The preferred embodiment discussed in detail here is, of course, only an exemplary way of calculating the coordinates. However, the invention is not at all restricted to this example. It is rather also possible to derive other equations from the geometric situation illustrated in the Figures by means of which the person skilled in the art can calculate the individual coordinates of the object position. It is mentioned only exemplarily that in a polar coordinate system all equations look completely different. However, the invention is based, i.a., on the general basic idea that two of the determined three propagation times define two intersecting elliptical orbits, as illustrated in FIG. 5b. Accordingly, the processor is preferably configured to determine a first elliptical orbit or a first semielliptical orbit on the basis of a first propagation time which the signal requires from the transmitter via the object to the first receiver within a second plane and to determine a second elliptical orbit or a second semielliptical orbit on the basis of a second propagation time which the signal requires from the transmitter via the object to the second receiver within the second plane, wherein the position of the object in the three-dimensional space is calculated using the position of the intersection of the two elliptical orbits or semielliptical orbits in the second plane without the invention being restricted to a specific kind of calculation.

The above-discussed preferred embodiment is based on the assumption that the transmitter 40 emits a signal essentially isotropically. However, other transmitters, such as, for example, the semicircular transmitter 60 illustrated in FIG. 6, can also be used instead. The semicircular transmitter 60 according to a second embodiment of the present invention comprises a main body 62 through which a slit 61 (also referred to a opening or gap) extends on a peripheral side of the main body 62. A signal is emitted originating from the slit 61 so as to propagate from there in the three-dimensional space. It can thus be achieved that a signal has a defined starting point on a semicircle, i.e., the signal escapes through the slit 61 from the semicircular transmitter 60 and thereupon propagates in the three-dimensional space above the semicircular transmitter 60.

In other words, a semicircular transmitter 60 is a transmitter having a signal source in the form of a semicircular gap 61. The signal is emitted at the same time from the signal source into the three-dimensional half space. The semicircular shape of the signal source enables an object to be detected above the semicircular transmitter 60, i.e., for z>0 (cf. FIG. 7). Variations of the semicircular transmitter 60 in which the signal source is smaller or greater than 180 degrees are certainly also possible.

FIG. 7 depicts a three-dimensional illustration of the situation according to the second embodiment of the present invention. The signal emitted by the semicircular transmitter 60 is reflected by the object 50 to be detected into the three receivers 10, 20, 30. In addition to the distances s, $e_1$, $e_2$, $e_3$, d, a, b, r, $y_{2D}$, $x_{2D}$ known from FIG. 2, the radius h of the semicircular transmitter 60 is indicated in FIG. 7.

The arrangement of the receivers 10, 20, 30 and the transmitter, here the semicircular transmitter 60, is preferably analogous to the arrangement as shown in FIG. 1. It is to be noted that when a semicircular transmitter 60 is used the center of the semicircle corresponds to the position of the transmitter 40 according to FIG. 1, i.e., the center of the semicircle preferably is, on the one hand, within the same plane as the receivers 10, 20, 30 and, on the other hand, on a straight line with the receivers 10, 20. Thus, the origin of the signal is at a predetermined distance h (radius of the semicircular transmitter 60) from the origin of the coordinate system (cf. FIG. 7).

According to the second embodiment of the present invention, three propagation time measurements are performed for the determination of the three-dimensional position of an object 50. The three propagation time measurements are performed by means of the semicircular transmitter 60 and the three receivers 10, 20, 30. A signal that propagates in the three-dimensional space until it hits an object 50 (distance s) and is partly reflected is emitted by the semicircular transmitter 60 as described above. The reflected parts of the signal hit the three receivers 10, 20, 30 (distances $e_1$, $e_2$, $e_3$). This yields the three propagation times that result from the propagation time from the semicircular transmitter 60 to the object 50 (time that the signal requires for the distance s) together with the propagation times from the object 50 to the individual receivers 10, 20, 30 (time that the signal requires for the respective distances $e_1$, $e_2$, $e_3$) (propagation time measurement).

The three receivers 10, 20, 30 and the center of the semicircle (radius origin) are preferably arranged or fixed in one plane (at the same height). The receiver 10 and the receiver 20 are preferably positioned on a straight line along with the semicircular transmitter 60 (preferably on the dashed line), i.e., preferably directly on the x-axis. In the x-direction the receiver 30 can have the distance b and in the y-direction the distance a from the coordinate origin O. The distances a and b can have any value. Preferably, a should be unequal to zero.

The consideration of the distance s that the signal travels from the semicircular transmitter 60 to the object 50 and of the individual distances $e_1$, $e_2$ and $e_3$ that the signal travels from the object 50 to the respective receivers 10, 20, 30 leads to the three-dimensional geometric construct shown in FIG. 7 along with the depicted auxiliary distances.

FIG. 8a illustrates the geometric construct of FIG. 7 in a top view (top view of the z-axis) and FIG. 8b illustrates the geometric construct of FIG. 7 in a side view (top view of the x-axis).

The two auxiliary distances $y_{2D}$ and d are always perpendicular to the x-axis and are connected with the object 50 at the top. These auxiliary distances, together with the distance a, form a triangular structure according to FIGS. 8a and 8b.

The geometrical construct provides the following equation:

$$a = \sqrt{d^2 - z^2} + \sqrt{y_{2D}^2 - z^2} \qquad (16)$$

When the equation (16) for the distance a is solved for z, the following equation is obtained for the z-coordinate of the object 50 in the three-dimensional space:

$$z = \pm \frac{1}{2} \frac{\sqrt{2 y_{2D}^2 a^2 - y_{2D}^4 - d^4 + 2 d^2 y_{2D}^2 + 2 d^2 a^2 - a^4}}{a} \qquad (17)$$

wherein the equation (17) has a positive sign with a>0 and a negative sign with a<0 (for the upper position of the object 50). For the lower position, the sign is reversed. Upper position means that the object 50 is above the plane defined by the three receivers 10, 20, 30. Lower position accordingly means that the object 50 is below the plane defined by the three receivers 10, 20, 30.

The auxiliary distance d in the equation (17) corresponds to the following equation:

$$d = \sqrt{\left(U_{se3} - \sqrt{x_{2D}^2 + (y_{2D} - h)^2}\right)^2 - (b - x_{2D})^2} \qquad (18)$$

The determination of the x-coordinate of the object 50 in the three-dimensional space is performed by means of the equation (19) and the equation (20). The equation (19) indicates the x-coordinate of the object 50 for a propagation time distance with $U_{se1} \geq U_{se2}$ and the equation (20) the x-coordinate for a propagation time distance with $U_{se1} < U_{se2}$. For the sake of completeness, it is mentioned that it can likewise read $U_{se1} > U_{se2}$ and $U_{se1} \leq U_{se2}$.

$$x_{SP3} = \frac{1}{2} \frac{\left( \begin{array}{c} 8h^2 f_1^2 f_2 + 8 f_2^3 U_{se1}^2 - 8 U_{se2}^2 f_1^3 - 2 U_{se1} U_{se2}^3 f_1 + 8 h^2 f_1^3 - 8 h^2 f_2^3 + 2 f_1 U_{se1}^2 U_{se2}^2 - 2 h^2 f_1 U_{se1}^2 - 8 f_2 U_{se1} U_{se2} f_1^2 - \\ 8 h^2 f_1 f_2^2 + 2 U_{se1}^3 f_2 U_{se2} - 2 h^2 f_2 U_{se1} U_{se2} + 2 h^2 f_2 U_{se2}^2 + 2 f_1 h^2 U_{se1} U_{se2} + 8 f_2^2 U_{se1} U_{se2} f_1 - 2 f_2 U_{se1}^2 U_{se2}^2 + \\ \sqrt{(U_{se1} - U_{se2})^2 h^2 (-U_{se2}^2 + h^2 + 4 f_2^2) \left( \begin{array}{c} U_{se1}^2 U_{se2}^2 - 2 U_{se1}^3 U_{se2} + U_{se1}^4 - h^2 U_{se2}^2 + 2 h^2 U_{se1} U_{se2} - h^2 U_{se1}^2 - \\ 4 f_2^2 U_{se1}^2 + 4 f_2^2 h^2 - 8 f_1 f_2 U_{se1}^2 + 8 f_1 f_2 h^2 - 4 f_1^2 U_{se2}^2 + 8 f_1^2 U_{se1} U_{se2} - \\ 8 f_1^2 U_{se1}^2 + 4 f_1^2 h^2 + 16 f_1^2 f_2^2 + 32 f_1^3 f_2 + 16 f_1^4 \end{array} \right)} \end{array} \right)}{-4 f_1^2 U_{se2}^2 - 4 f_2^2 U_{se1}^2 + 4 f_2^2 h^2 + 4 f_1^2 h^2 - h^2 U_{se2}^2 - h^2 U_{se1}^2 - 8 f_1 f_2 U_{se1} U_{se2} + 8 f_1 f_2 h^2 + 2 h^2 U_{se1} U_{se2}} \qquad (19)$$

$$x_{SP4} = -\frac{1}{2} \frac{\left( \begin{array}{c} -8h^2 f_1^2 f_2 - 8 f_2^3 U_{se1}^2 + 8 U_{se2}^2 f_1^3 + 2 U_{se1} U_{se2}^3 f_1 - 8 h^2 f_1^3 + 8 h^2 f_2^3 - 2 f_1 U_{se1}^2 U_{se2}^2 + 2 h^2 f_1 U_{se1}^2 + 8 f_2 U_{se1} U_{se2} f_1^2 + \\ 8 h^2 f_1 f_2^2 - 2 U_{se1}^3 f_2 U_{se2} + 2 h^2 f_2 U_{se1} U_{se2} - 2 h^2 f_2 U_{se2}^2 - 2 f_1 h^2 U_{se1} U_{se2} - 8 f_2^2 U_{se1} U_{se2} f_1 + 2 f_2 U_{se1}^2 U_{se2}^2 + \\ \sqrt{(U_{se1} - U_{se2})^2 h^2 (-U_{se2}^2 + h^2 + 4 f_2^2) \left( \begin{array}{c} U_{se1}^2 U_{se2}^2 - 2 U_{se1}^3 U_{se2} + U_{se1}^4 - h^2 U_{se2}^2 + 2 h^2 U_{se1} U_{se2} - h^2 U_{se1}^2 - \\ 4 f_2^2 U_{se1}^2 + 4 f_2^2 h^2 - 8 f_1 f_2 U_{se1}^2 + 8 f_1 f_2 h^2 - 4 f_1^2 U_{se2}^2 + 8 f_1^2 U_{se1} U_{se2} - \\ 8 f_1^2 U_{se1}^2 + 4 f_1^2 h^2 + 16 f_1^2 f_2^2 + 32 f_1^3 f_2 + 16 f_1^4 \end{array} \right)} \end{array} \right)}{-4 f_1^2 U_{se2}^2 - 4 f_2^2 U_{se1}^2 + 4 f_2^2 h^2 + 4 f_1^2 h^2 - h^2 U_{se2}^2 - h^2 U_{se1}^2 - 8 f_1 f_2 U_{se1} U_{se2} + 8 f_1 f_2 h^2 + 2 h^2 U_{se1} U_{se2}} \qquad (20)$$

The distances $U_{se1}$, $U_{se2}$ and $U_{se3}$ are distances generated by the propagation time (sum of the distance s and the respective distance $e_n$). These distances are determined via the propagation speed c of the signal and the propagation times $t_1$, $t_2$ and $t_3$ of the signal as follows:

$$U_{sen} = c \, t_n \qquad (21)$$

The determination of the y-coordinate of the object 50 in the three-dimensional space is performed by means of the following equation:

$$y = \pm \sqrt{y_{2D}^2 - z^2} \qquad (22)$$

wherein the equation (22) for the y-coordinate in the three-dimensional space has a positive sign with y>q−|a| and a>0, as well as with y≤q−|a| and a<0. The equation (22) has a negative sign with all other value ranges.

The auxiliary distance q mentioned in connection with the case distinction is calculated as follows:

$$q = \sqrt{d^2 - z^2} \qquad (23)$$

The auxiliary distances $x_{2D}$ and $y_{2D}$ mentioned in the above equations are the x-coordinate and y-coordinate of the object 50 in the case of the position determination of the object 50 in the two-dimensional space.

FIG. 9 shows a semicircular transmitter 60 and two receivers 10, 20 for the determination of the x-coordinate and y-coordinate ($x_{2D}$ and $y_{2D}$) of the object 50 in the two-dimensional space.

On the basis of FIG. 9, the geometric construct according to FIG. 10a can be generated. Furthermore, four intersecting semielliptical orbits according to FIG. 10b are generated by this arrangement.

According to the present invention, in particular the second embodiment, the position of the object 50 is at the intersection of the two elliptical orbits (semielliptical orbits). On the basis of the condition that the signal of the semicircular transmitter propagates above the plane, the intersection determining the position of the object 50 is likewise located above the two-dimensional construct (above the $x_{2D}$ axis) according to FIG. 9. It is clear that the semicircular transmitter 60 can also transmit in any direction other than the one in this example. It is in any case clear that due to the restricted transmission area of the semicircular transmitter 60 the intersection relevant to the position of the object is defined.

The following equations for the two propagation time distances ($U_{se1}$ and $U_{se2}$) result from the geometric construct:

$$U_{se1} = \sqrt{(y_{2D}-h)^2 + x_{2D}^2} + \sqrt{y_{2D}^2 + (2f_1 - x_{2D})^2} \quad (24)$$

and $$U_{se2} = \sqrt{(y_{2D}-h)^2 + x_{2D}^2} + \sqrt{y_{2D}^2 + (2f_2 + x_{2D})^2} \quad (25)$$

When the equation (24) for the propagation time distance $U_{se1}$ is solved for $y_{2D}$, the following equation is obtained:

$$y_{2D} = \pm \frac{1}{2} \frac{\left(\begin{array}{c} h^2 U_{se1}^2 - h^4 + \\ 4f_1^2 h^2 - \\ 4f_1 x_{2D} h^2 + U_{se1} \end{array}\right) \sqrt{h^2 \left(\begin{array}{c} 16f_1^4 - 8f_1 x_{2D} h^2 + \\ 16f_1^2 x_{2D}^2 - 32f_1^3 x_{2D} + \\ 8f_1^2 h^2 + 4x_{2D}^2 h^2 + \\ h^4 + 8f_1 x_{2D} U_{se1}^2 - \\ 8f_1^2 U_{se1}^2 - 4U_{se1}^2 x_{2D}^2 - \\ 2h^2 U_{se1}^2 + U_{se1}^4 \end{array}\right)}}{(U_{se1}^2 - h^2)h} \quad (26)$$

When the equation (25) for the propagation time distance $U_{se2}$ is solved for $y_{2D}$, the following equation is obtained:

$$y_{2D} = \pm \frac{1}{2} \frac{\left(\begin{array}{c} h^2 U_{se2}^2 - h^4 + \\ 4f_2^2 h^2 - \\ 4f_2 x_{2D} h^2 + U_{se2} \end{array}\right) \sqrt{h^2 \left(\begin{array}{c} 16f_2^4 - 8f_2 x_{2D} h^2 + \\ 16f_2^2 x_{2D}^2 - 32f_2^3 x_{2D} + \\ 8f_2^2 h^2 + 4x_{2D}^2 h^2 + \\ h^4 + 8f_2 x_{2D} U_{se2}^2 - \\ 8f_2^2 U_{se2}^2 - 4U_{se2}^2 x_{2D}^2 - \\ 2h^2 U_{se2}^2 + U_{se2}^4 \end{array}\right)}}{(U_{se2}^2 - h^2)h} \quad (27)$$

When the equation (26) and the equation (27), with a positive sign, are equated, zeroed and solved for $x_{2D}$, the equation for the $x_{2D}$ coordinate is obtained. It is the same as the one for the x-coordinate and thus corresponds to the equation (19) and the equation (20).

It is refrained from the insertion of the individual results for the second embodiment due to the complexity of the expressions. It is clear to the person skilled in the art that this can be made essentially analogously to the way described on the basis of the first embodiment in order to obtain a "terminal equation" for the coordinates of the object 50 in the three-dimensional space. However, it is also explicitly noted that it is not absolutely necessary to set up the "terminal equations" since a successive calculation of the above described calculation steps is sufficient to determine the position of the object 50 in the three-dimensional space.

FIG. 11 depicts a third embodiment of the present invention comprising three sensors 100, 200, 300. Each of the sensors 100, 200, 300 can be a component that has both transmitting functionality and receiving functionality. According to the present invention, at least three sensors 100, 200, 300 having receiving functionality are to be provided and at least one of the at least three sensors 100, 200, 300 can additionally be provided with transmitting functionality. However, it is also possible that all of the at least three sensors 100, 200, 300 are provided with transmitting and receiving functionalities, for switching through the system, e.g., to transmit from different transmitting positions (either at the same time or in a time-shifted way).

According to the third embodiment, the determination of the three-dimensional position of an object 50 can also be performed on the basis of three propagation time measurements. The three propagation time measurements are performed according to the third embodiment by means of three sensors 100, 200, 300, wherein at least one sensor (e.g., sensor 100) can transmit and receive. It is likewise possible that separate transmitting and receiving devices are installed closely to each other for sending and receiving from more or less the same position. In other words, each of the sensors 100, 200, 300 can also consist of two separate transmitting and receiving devices arranged in direct proximity to each other.

According to FIG. 12, a signal that propagates in the three-dimensional space until it hits an object 50 (distance s) and is partly reflected is emitted by the sensor 100. The reflected parts of the signal hit the three sensors 100, 200, 300 (distances $e_1$, $e_2$, $e_3$). This yields the three propagation times that result from the propagation time from the sensor 100 to the object 50 together with the propagation times from the object 50 to the individual sensors 100, 200, 300 (propagation time measurement).

The three sensors 100, 200, 300 are preferably arranged in one plane (i.e., at the same height). In the x-direction the sensor 300 can have the distance b and in the y-direction the distance a from the coordinate origin O. The distances a and b can have any value wherein the distance a preferably is unequal to zero. The coordinate origin O is preferably on a straight line that preferably extends between the sensors 100 and 200. However, it is clear that the position of the coordinate origin O has no influence on the workability of the present invention.

The consideration of the distance s that the signal travels from the sensor 100 to the object 50 and of the individual distances $e_1$, $e_2$ and $e_3$ that the signal travels from the object 50 to the respective sensors 100, 200, 300 leads to the three-dimensional geometric construct shown in FIG. 12 along with the depicted auxiliary distances ($x_{2D}$, $y_{2D}$, a, b, r, d).

A top view of the geometric construct according to FIG. 12 (top view of the z-axis) yields together with the auxiliary distances the geometric construct according to FIG. 13a. A side view of the geometric construct according to FIG. 12 (top view of the x-axis) yields together with the auxiliary distances the geometric construct according to FIG. 13b.

The two auxiliary distances $y_{2D}$ and d are always perpendicular to the x-axis and are connected with the object at the top. These form together with the distance a a triangular structure according to FIGS. 13a and 13b.

The geometrical construct provides the following equation:

$$a=\sqrt{d^2-z^2}+\sqrt{y_{2D}^2-z^2} \quad (28)$$

When the equation (28) for the distance a is solved for z, the following equation is obtained for the z-coordinate of the object 50 in the three-dimensional space:

$$z = \pm \frac{1}{2} \frac{\sqrt{2y_{2D}^2 a^2 - y_{2D}^4 - d^4 + 2d^2 y_{2D}^2 + 2d^2 a^2 - a^4}}{a} \quad (29)$$

wherein the equation (29) has a positive sign with a>0 and a negative sign with a<0 (for the upper position of the object 50). For the lower position, the sign is reversed.

The auxiliary distance d in the equation (29) corresponds to the following equation:

$$d = \sqrt{\left(U_{se3} - \frac{U_{se1}}{2}\right)^2 - (b - x_{2D})^2} \quad (30)$$

The determination of the x-coordinate of the object 50 in the three-dimensional space is performed by means of the following equation:

$$x = -\frac{1}{2} \frac{-f_1^2 + f_2^2 + U_{se1} U_{se2} - U_{se2}^2}{f_1 + f_2} \quad (31)$$

The distances $U_{se1}$, $U_{se2}$ and $U_{se3}$ are distances generated by the propagation time (sum of the distance s and the respective distance $e_n$). These distances are determined via the propagation speed c of the signal and the propagation times $t_1$, $t_2$ and $t_3$ of the signal as follows:

$$U_{sen}=c\,t_n \quad (32)$$

The determination of the y-coordinate of the object 50 in the three-dimensional space is performed by means of the following equation:

$$y=\pm\sqrt{y_{2D}^2-z^2} \quad (33)$$

wherein the equation (33) for the y-coordinate in the three-dimensional space has a positive sign with y>q−|a| and a>0, as well as with y≤q−|a| and a<0. The equation (33) has a negative sign with all other value ranges.

The auxiliary distance q mentioned in connection with the case distinction is calculated as follows:

$$q=\sqrt{d^2-z^2} \quad (34)$$

The auxiliary distances $x_{2D}$ and $y_{2D}$ mentioned in the above equations are the x-coordinate and y-coordinate of the object 50 in the case of the position determination of the object 50 in the two-dimensional space (where applicable in the second plane).

A transmitter 100 and two receivers 100, 200 are required for the determination of the x-coordinate and y-coordinate ($x_{2D}$ and $y_{2D}$) of the object 50 in the two-dimensional space (see FIG. 14). The geometric construct of FIG. 15a is derived on the basis of FIG. 14. According to FIG. 15b, two circular orbits or semicircular orbits are formed by the two propagation time distances. The positive result of the equation (37) and the equation (38) for the circular orbits describes the upper semicircular orbit and the negative the lower.

The position of the object 50 is at the intersection of the two circular orbits. The following equations for the two propagation time distances ($U_{se1}$ and $U_{se2}$) result from the geometric construct (FIG. 15b):

$$U_{se1} = 2\sqrt{y_{2D}^2 + (f_1 - x_{2D})^2} \quad (35)$$

and $$U_{se2} = \sqrt{y_{2D}^2 + (f_2 - x_{2D})^2} + \frac{U_{se1}}{2} \quad (36)$$

When the equation (35) for the propagation time distance $U_{se1}$ is solved for $y_{2D}$, the following equation is obtained:

$$y_{2D}=\pm\tfrac{1}{2}\sqrt{-4x_{2D}^2+U_{se1}^2-4f_1^2+8f_1 x_{2D}} \quad (37)$$

When the equation (36) for the propagation time distance $U_{se2}$ is solved for $y_{2D}$, the following equation is obtained:

$$y_{2D}=\pm\tfrac{1}{2}\sqrt{-4f_2^2+U_{se1}^2-4U_{se1}U_{se2}+4U_{se2}^2-8f_2 x_{2D}-4x_{2D}^2} \quad (38)$$

The equations for the positive (+) semicircular orbits (37) and (38) are equated and zeroed:

$$\pm\left(\frac{1}{2}\sqrt{-4x_{2D}^2 + U_{se1}^2 - 4f_1^2 + 8f_1 x_{2D}} - \right. \quad (39)$$

$$\left.\frac{1}{2}\sqrt{-4f_2^2 + U_{se1}^2 - 4U_{se1}U_{se2} + 4U_{se2}^2 - 8f_2 x_{2D} - 4x_{2D}^2}\right) = 0$$

When the equation (39) is solved for $x_{2D}$, the following equation is obtained:

$$x_{2D} = -\frac{1}{2}\frac{-f_1^2 + f_2^2 + U_{se1}U_{se2} - U_{se2}^2}{f_1 + f_2} \quad (40)$$

When the equations for $x_{2D}$ and $y_{2D}$ for the positive semielliptical orbit are inserted into the equation (29) for the three-dimensional z-coordinate and into the equation (33) for the three-dimensional y-coordinate, the equation (41) and equation (42) are obtained:

$$z = \pm \frac{1}{32a} \sqrt{\begin{array}{l} -\frac{1}{(f_1+f_1)^2}(8(U_{se2}^2 - f_1^2 - 2f_1f_2 - f_2^2)(U_{se2}^2 - 2U_{se1}U_{se2} - f_1^2 - 2f_1f_2 - f_2^2 + U_{se1}^2)a^2) - \\ \frac{1}{(f_1+f_2)^4}((U_{se2}^2 - f_1^2 - 2f_1f_2 - f_2^2)^2(U_{se2}^2 - 2U_{se1}U_{se2} - f_1^2 - 2f_1f_2 - f_2^2 + U_{se1}^2)^2) - \\ 16\left(\left(U_{se3} - \frac{1}{2}U_{se1}\right)^2 - \left(b + \frac{1}{2}\frac{-f_1^2 + f_2^2 + U_{se1}U_{se2} - U_{se2}^2}{f_1 + f_2}\right)^2\right)^2 - \\ \frac{1}{(f_1+f_1)^2}\left(\begin{array}{l}8\left(\left(U_{se3} - \frac{1}{2}U_{se1}\right)^2 - \left(b + \frac{1}{2}\frac{-f_1^2 + f_2^2 + U_{se1}U_{se2} - U_{se2}^2}{f_1 + f_2}\right)^2\right) \\ (U_{se2}^2 - f_1^2 - 2f_1f_2 - f_2^2)(U_{se2}^2 - 2U_{se1}U_{se2} - f_1^2 - 2f_1f_2 - f_2^2 + U_{se1}^2)\end{array}\right) + \\ 32\left(\left(U_{se3} - \frac{1}{2}U_{se1}\right)^2 - \left(b + \frac{1}{2}\frac{-f_1^2 + f_2^2 + U_{se1}U_{se2} - U_{se2}^2}{f_1 + f_2}\right)^2\right)a^2 - 16a^4\end{array}} \quad (41)$$

$$y = \pm \frac{1}{8} \tag{42}$$

$$\sqrt{\frac{1}{a^2}\left(\begin{array}{l} -\frac{1}{(f_1+f_1)^2}(16(U_{se2}^2 - f_1^2 - 2f_1f_2 - f_2^2)(U_{se2}^2 - 2U_{se1}U_{se2} - f_1^2 - 2f_1f_2 - f_2^2 + U_{se1}^2)) - \\ \left(\begin{array}{l} -\frac{1}{(f_1+f_1)^2}(8(U_{se2}^2 - f_1^2 - 2f_1f_2 - f_2^2)(U_{se2}^2 - 2U_{se1}U_{se2} - f_1^2 - 2f_1f_2 - f_2^2 + U_{se1}^2)a^2) - \\ \frac{1}{(f_1+f_2)^4}((U_{se2}^2 - f_1^2 - 2f_1f_2 - f_2^2)^2(U_{se2}^2 - 2U_{se1}U_{se2} - f_1^2 - 2f_1f_2 - f_2^2 + U_{se1}^2)^2) - \\ 16\left(\left(U_{se3} - \frac{1}{2}U_{se1}\right)^2 - \left(b + \frac{1}{2}\frac{-f_1^2 + f_2^2 + U_{se1}U_{se2} - U_{se2}^2}{f_1 + f_2}\right)^2\right)^2 - \\ \frac{1}{(f_1+f_1)^2}\left(\begin{array}{l}8\left(\left(U_{se3} - \frac{1}{2}U_{se1}\right)^2 - \left(b + \frac{1}{2}\frac{-f_1^2 + f_2^2 + U_{se1}U_{se2} - U_{se2}^2}{f_1 + f_2}\right)^2\right) \\ (U_{se2}^2 - f_1^2 - 2f_1f_2 - f_2^2)(U_{se2}^2 - 2U_{se1}U_{se2} - f_1^2 - 2f_1f_2 - f_2^2 + U_{se1}^2)\end{array}\right) + \\ 32\left(\left(U_{se3} - \frac{1}{2}U_{se1}\right)^2 - \left(b + \frac{1}{2}\frac{-f_1^2 + f_2^2 + U_{se1}U_{se2} - U_{se2}^2}{f_1 + f_2}\right)^2\right)a^2 - 16a^4 \end{array}\right)\end{array}\right)}$$

The two elliptical orbits or semielliptical orbits that are generated by the two propagation times can also both be replaced with ellipsoids. The object is then anywhere on the orbit that is generated by the two intersecting ellipsoids. In the case of the circular orbit, the circular orbits or semicircular orbits that are generated by the two propagation times accordingly can also both be replaced with spheres. The object is then anywhere on the orbit that is generated by the two intersecting spheres.

A third ellipsoid/sphere which intersects with the orbit (that is generated by the intersection of the two first ellipsoids/spheres) is then formed by the third propagation time. Two intersections that correspond to the three-dimensional position of the object are formed at the top in the positive area and at the bottom in the negative area. One of the two intersections can then be selected as the correct position of the object, for example, by means of the directivity of the transmitter and/or the receivers.

It is also possible to replace only one of the two elliptical orbits/circular orbits or semielliptical orbits/semicircular orbits that are formed by the two propagation times with an ellipsoid/a sphere. The elliptical orbit/circular orbit or semielliptical orbit/semicircular orbit then intersects with the ellipsoid/sphere whereby two intersections are formed in the second plane (in which the elliptical orbit/circular orbit or semielliptical orbit lies). Thus, the three-dimensional position of the object can be also determined on the basis of the position of the intersection (or the intersections, at the top in the positive area and at the bottom in the negative area in the case of transmitters and receivers that can transmit and detect in 360°) in the second plane (that is generated by the one elliptical orbit/circular orbit or semielliptical orbit/semielliptical orbit) and the position/angle/tilt of the second plane (in comparison to the first plane) in the three-dimensional space, said position/angle/tilt being generated by the third propagation time.

An ellipsoid/sphere which intersects with the intersection (or intersections, see above) in the second plane can also be formed by the third propagation time and thereby the three-dimensional position can be determined.

FIG. 16 exemplarily shows the above mentioned possibility of switching through the transmission functionality of the various sensors 100, 200, 300. In the illustrated case 1, the sensor 200 assumes the transmitting and receiving functionality, wherein the sensors 100, 300 only serve as receivers. In the case 2, the sensor 100 assumes the transmitting and receiving functionality and the sensors 200, 300 solely serve as receivers. In the case 3, the sensor 300 assumes the transmitting and receiving functionality and the sensors 100, 200 solely serve as receivers. It may be advantageous if this functionality can be controlled according to requirements, i.e., with each new measurement another sensor 100, 200 300 could serve as a transmitter and simultaneously as a receiver.

FIG. 17 schematically illustrates an exemplary signal measured at one of the receivers. A synchronization pulse (rectangular signal at the beginning of the pulse sequence in FIG. 17) can be transmitted in advance for the purpose of synchronization in order to ensure a precise measurement of the propagation times. FIG. 17 shows a first signal 1 ($t_{1\_p1}$), which represents the direct pick-up (emitted signal from the transmitter on the direct way to the receiver). The subsequent pulses 2 to 5 are the signals reflected by different objects 1-n.

According to the present invention, the size of the object can be determined by the pulse height (amplitude) and the measured propagation time ($t_{1,p2}$, $t_{1,p3}$, $t_{1,p4}$, $t_{1,pn}$). The higher the amplitude and the shorter the propagation time, the larger the object.

A comparison of the signals 2 and 5 reveals, i.a., that the two signals essentially have the same amplitude but that the signal 5 has a considerably longer propagation time ($t_{1,pn} > t_{1,p2}$). It can be concluded therefrom that the nth object must be larger than the first object.

The extension of the object can be determined by the width of the signal. The wider (longer) the signal, the more extensive the object. When, for example, signal 3 is looked at, it can be seen that it is considerably wider than the other signals. It can be concluded therefrom that the second object has a larger extension than the other objects. The second object could be, for example, a pipe (small reflective area, larger extension).

This embodiment of the present invention can be configured, i.a., to represent the signals, preferably the wider signals, such as, e.g., signal 3, by several short pulses (by means of corresponding evaluation algorithms and hardware). This permits to represent the object as a point cloud so as to better understand the object geometry in this way.

It is further possible with the present invention to determine a speed of the individual objects or points that has been determined by the Doppler effect. The 3D position/location of the object or several objects, the condition of the object or objects, the speed of the object or objects and/or the individual points (point cloud) can be simultaneously determined (on the basis of one measurement).

Even though the algorithm of the preferred embodiments of the present invention was described by means of a small to punctiform object for the sake of clarity and for ease of understanding, it is clear to the person skilled in the art that the present invention is not restricted thereto. Methods for the position determination of an extensive object are described in the following by way of example.

The wave hits the extensive object as a spherical wave (electromagnetic waves, e.g., radio waves, microwaves, thermal radiation, light, x-rays, gamma radiation; pressure waves, e.g., acoustic waves, shock waves; gravitational waves; radiation, such as, e.g., particle radiation and undulatory radiation; plasma waves; matter waves; bending waves; seismic waves; magnetic waves; electric waves). Thus, an area is first scanned in its center and then at its edges.

FIG. 18 further exemplary shows two areas 51, 52 (extensive objects) that reflect a signal emitted from the sensor unit 100 (transmitter and receiver). For the sake of clarity, only the reflected signals are shown in FIG. 18.

The area 51 is to the left of the sensor unit 100 and therefore first reflects the signal on the right side (continuous line). At the end, the left side (dashed line) of the area 51 reflects the signal to the sensor 100.

The area 52 is in this example below the sensor unit 100, slightly offset to the left, and reflects the first signal (continuous line) from the area 52. The reflected signal of the right side of the area 52 arrives at the sensor 100 somewhat later, i.e. takes a longer time (dotted line). At the end, the left side (dashed line) of the area 52 reflects the signal to the sensor 100. The areas 51, 52 reflect the signal on the entire area. However, for the sake of clarity, only individual reflected signals are depicted in FIG. 18.

FIG. 19 depicts the time profile of the received signal reflected at the areas 51, 52 (to one of the receivers, e.g., sensor 100 from FIG. 18). In comparison to FIG. 17, it is apparent that the reflected signals of the individual areas 51, 52, in comparison to the reflected signals (signals 1 to 5 of FIG. 17) at the individual point objects, have a temporal extension $t_{pn}$. The size and/or the reflectivity of an area/object can be determined by the height of the pulse (amplitude) and/or the surface below the signal waveform (integrated via the signal waveform), the measured propagation time $t_n$ and/or pulse duration $t_{pn}$. In other words, the individual signals reflected at the surface overlap and an extensive signal is formed.

When it is looked at the signal waveforms of three receivers depicted in FIG. 20 (the continuous line corresponds to the signal in a first receiver, the dashed line corresponds to the signal in a second receiver and the finer dashed line corresponds to the signal in a third receiver), the individual, time-shifted reflected signals can be seen.

The signal waveform concerning the reflection at the first area 51 reveals that the reflected signals arrive in a time-shifted way due to the receivers arranged in the space. The signal waveform concerning the reflection at the second area 52 reveals that the reflected signals arrive at the same time at the individual receivers, since the signal first is reflected exactly below the transmitter and the receivers, in this example, have the same distance to the transmitter. At the end of the signal waveform at the second area 52 the signals stop in a time-shifted way since the area 52 is not exactly below the sensor unit 100 but is slightly offset to the left.

When the position is determined on the basis of the propagation time $t_n$, the position of the point on the area 51, 52 is obtained from which the signal was reflected first. When the position is measured on the basis of the time until the end of the signal (propagation time $t_n$+pulse duration $t_{pn}$), the position of the point on the area 51, 52 is obtained from which the signal was reflected last. For areas 51, 52 which are not below the transmitter 100, these two position values yield the starting position and end position of the areas 51, 52 and thus the position and extension of an extensive object in the space.

When the area 51, 52 is below the transmitter, the position of the point on the area 51, 52 from which the signal was reflected first and the position of the point on the area 51, 52 from which the signal was reflected last can be determined as described above. However, in order to be able to determine the starting point and the end point of the area 51, 52, e.g., either the measurement should be performed once again with a transmitter that is not above the area 51, 52 (wherein the transmitter must have a distance of more than one wavelength to the position of the other (first) transmitter) or, e.g., the method in which all three sensors transmit with different codes (different frequencies or encoded signal) and then are adjusted to receive (the distance between two sensors should be in this connection greater than the extension of the area 51, 52 in order that it can be ensured that one of the sensors is at no time above the area 51, 52) should be used.

FIG. 20 also reveals that the individual reflection signals can be assigned to the individual areas 51, 52. The assignment of the reflection signals belonging to an object can be made, for example, via:

the temporal proximity to each other (the time-shift between the individual reflection signals that is generated by the spatial distribution of the sensors), the similar signal profiles (each reflected signal has a signal profile which is specific to the object and by means of which the at least three signals reflected at the same object can be assigned to each other), the similar amplitudes (due to its size, geometry and reflectivity, each object has another amplitude, on the basis of which the individual signals reflected from the object can be assigned to each other), the reflection duration (the reflection duration is dependent on the extension of the object and for this reason can be assigned to the individual objects having different sizes; the reflection duration can be determined with a high accuracy in particular in the case of areas having a greater extension than one wavelength).

When these criteria are applied to the received signals, the signals can be assigned to the individual objects (areas 51, 52).

In this connection, the received signals must not overlap, however. This means that the individual areas 51, 52 should have a minimum distance of more than one wavelength from each other in order to be recognized as two individual areas 51, 52 (should the areas 51, 52 have a distance of one wavelength or less, they are recognized as one continuous area 51, 52).

Two objects/areas 53, 54 having the same distance (±one wavelength) to the sensor 100 but being offset in different directions constitute a special case (see FIG. 21).

In this case, the reflected signals would overlap and could not be assigned to the individual areas. As mentioned above, this can be performed, for example, either by a repeated measurement with a transmitter that is not exactly between the areas 53, 54 (wherein the transmitter must have a distance of more than one wavelength to the position of the other (first) transmitter) or, e.g., the method in which all three sensors transmit with different codes (different frequencies or encoded signal) and then are adjusted to receive (in this connection, the individual sensors should have a distance of more than one wavelength to each other) can be used.

This is analogously also applicable to individual objects/points (punctiform objects). They should preferably also have a minimum distance of more than one wavelength to each other in order to be unambiguously recognized as two objects/points (punctiform objects).

FIG. 22 shows a schematic illustration of a rough surface. The roughness consists of tips (points) and areas. The position of the individual tips and areas can be determined as described above and thus the condition and in particular the surface condition (3D scan of the surface/point cloud of the surface) of an object can be determined. It is also in this case the wavelength that determines the resolution limit of the roughness of the surface to be examined.

The above described methods can be used, for example, also in vacuum, in gases (e.g., air), in liquid (e.g., water), in solid state bodies (e.g., iron at standard conditions) or also in a plasma environment.

While the present invention has been described and illustrated here with reference to its preferred embodiments, it is apparent to those skilled in the art that various modifications and changes can be made thereto without departing from the scope of protection. It is thus intended that the present invention covers the modifications and changes to this invention as far as they are covered by the scope of protection of the annexed claims and their equivalents. Furthermore, features that have been described in connection with a specific embodiment are not to be understood solely in connection with other features of this embodiment. It is rather clear that a combination of features from different embodiments is also possible. Moreover, a feature described in connection with another feature can be present in a possible embodiment according to the present invention without the other feature.

The invention claimed is:

1. A device for determining a three-dimensional position of an object, wherein the device comprises:
   a first transmitter that is adapted to emit a first signal;
   at least three receivers comprising a first receiver, a second receiver, and a third receiver, wherein the at least three receivers and the first transmitter are arranged within a first plane, wherein the first receiver and the second receiver are arranged along a first straight line, and the third receiver is arranged at a distance from the first straight line; and
   a processor that is configured to determine a first propagation time, a second propagation time, and a third propagation time of the first signal from the first transmitter to the object and then to the first, second, or third receiver, respectively, wherein the processor is further configured to determine the three-dimensional position of the object on the basis of the determined first, second, and third propagation times as well as on the basis of the arrangement of the first transmitter and the first, second, and third receivers, wherein the processor is configured to determine a first elliptical orbit or a first semielliptical orbit within a second plane on the basis of the first propagation time and to determine a second elliptical orbit or a second semielliptical orbit within the second plane on the basis of the second propagation time, wherein the position of the object in three-dimensional space is calculated using a position of an intersection of the first and second elliptical orbits or semielliptical orbits in the second plane.

2. The device according to claim 1, wherein the first transmitter is arranged on the first straight line.

3. The device according to claim 1, wherein a first focal point of a first elliptical orbit coincides with a second focal point of the first elliptical orbit and a first focal point of the second elliptical orbit coincides with a second focal point of the second elliptical orbit.

4. The device according to claim 3, wherein the processor is further configured to determine an angle between the first and second planes on the basis of a third propagation time that the first signal requires from the first transmitter via the object to the third receiver.

5. The device according to claim 1, wherein the processor is further configured to determine an extension and/or a size and/or a condition of the surface of an object on the basis of a shape and/or a propagation time of one or more signals received by one or more of the at least three receivers.

6. The device according to claim 2, wherein the position of the first transmitter is identical to the position of one of the first, second, or third receiver.

7. The device according to claim 6, wherein one of the first, second, or third receiver also serves as the first transmitter.

8. The device according to claim 2, wherein the first transmitter is arranged between the first and second receivers.

9. A method for determining a three-dimensional position of an object, comprising the steps of:
   emitting a first signal from a first transmitting position and at least partly reflecting the first signal by the object;
   receiving the at least partly reflected first signal at three or more receiving positions comprising a first receiving position, a second and receiving position and a third receiving position, wherein the three or more receiving positions are arranged within a first plane comprising the first transmitting position, wherein the first receiving position and the second receiving position are arranged along a first straight line, and the third receiving position is arranged at a distance from the first straight line;

determining a first propagation time, a second propagation time, and a third propagation time of the first signal from the first transmitting position to the object and then to the first, second, or third receiving position, respectively; and detecting the three-dimensional position of the object using the determined first, second, and third propagation times as well as the arrangement of the first transmitting position and the first, second, and third receiving positions, wherein the detection of the position of the object in the three-dimensional space is performed using an intersection of a first and a second elliptical orbit or a first and a second semielliptical orbit within a second plane, wherein the first propagation time of the first signal defines the first elliptical orbit or the first semielliptical orbit in the second plane and the second propagation time of the first signal defines the second elliptical orbit or the second semielliptical orbit in the second plane.

10. The method according to claim 9, wherein the first transmitting position is arranged along the first straight line.

11. The method according to claim 9, wherein determination of a first coordinate of the three-dimensional position of the object is performed on the basis of the first and the second propagation time that the first signal requires from the first transmitting position via the object to the first and the second receiving positions, and the distances of the first and the second receiving positions to the first transmitting position, wherein the first coordinate defines the position of the object along the first straight line.

12. The method according to claim 9, wherein a first focal point of a first elliptical orbit coincides with a second focal point of a first elliptical orbit and a first focal point of a second elliptical orbit coincides with a second focal point of a second elliptical orbit.

13. The method according to claim 11, wherein calculation of the position of the object in the three-dimensional space is performed using an angle between the first and second planes, wherein the third propagation time that the first signal requires from the first transmitting position via the object to the third receiving position defines the angle.

14. The method according to claim 9, wherein the method comprises a step of calculating distances of the first, second, and third receiving positions to the first transmitting position, wherein the calculation of the distances is based on a propagation time of the first signal transmitted directly from the first transmitting position to the respective receiving position using a predetermined propagation speed.

15. The method according to claim 9, wherein the method comprises a step of calculating a propagation speed of the emitted first signal, wherein the calculation of the propagation speed is based on the first signal transmitted directly from the first transmitting position to one of the three or more receiving positions using a predetermined distance between the first transmitting position and the one of the three or more receiving positions.

16. The method according to claim 9, wherein the method comprises a step of calculating an extension and/or a size and/or a condition of a surface of the object using a shape and/or a propagation time of one or more signals received by one or more of the three or more receiving positions.

17. The method according to claim 9, wherein the method is carried out repeatedly.

18. The method according to claim 10, wherein the first transmitting position is identical to one of the first, second, or third receiving position.

19. The method according to claim 10, wherein the first transmitting position is between the first and second receiving positions.

20. The method according to claim 9, wherein the method is carried out repeatedly and the first transmitting position alters between two or more of the three or more receiving positions.

* * * * *